United States Patent
Toriyama

(10) Patent No.: US 12,160,554 B2
(45) Date of Patent: Dec. 3, 2024

(54) COLOR IMAGE FORMING APPARATUS DETERMINING AN INK CORRECTION AMOUNT FOR REDUCING INK BLEEDING, AND COLOR IMAGE FORMING METHOD

(71) Applicant: KONICA MINOLTA, INC., Tokyo (JP)

(72) Inventor: Hideyuki Toriyama, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/308,120

(22) Filed: Apr. 27, 2023

(65) Prior Publication Data

US 2023/0396727 A1 Dec. 7, 2023

(30) Foreign Application Priority Data

Jun. 6, 2022 (JP) .................................. 2022-091680

(51) Int. Cl.
*H04N 1/60* (2006.01)

(52) U.S. Cl.
CPC ........... *H04N 1/603* (2013.01); *H04N 1/6094* (2013.01)

(58) Field of Classification Search
None
See application file for complete search history.

(56) References Cited

U.S. PATENT DOCUMENTS

2020/0031136 A1* 1/2020 Yokouchi ............ H04N 1/6038

FOREIGN PATENT DOCUMENTS

| JP | 2000177151 A | | 6/2000 |
|---|---|---|---|
| JP | 2002103596 A | | 4/2002 |
| JP | 2002292848 A | | 10/2002 |
| JP | 2017117331 A | * | 6/2017 |
| JP | 2021000793 A | | 1/2021 |

OTHER PUBLICATIONS

Translation of JP 2017-117331 (Year: 2017).*

* cited by examiner

*Primary Examiner* — Lennin R Rodriguezgonzalez
(74) *Attorney, Agent, or Firm* — Holtz, Holtz & Volek PC

(57) ABSTRACT

A color image forming apparatus includes a controller implemented using one or more hardware processors, wherein the controller: detects a line area; detects a background area adjacent to the line area; detects first one or more ink colors of first one or more inks to be used in the line area; detects second one or more ink colors of second one or more inks to be used in the background area; compares the first one or more ink colors and the second one or more ink colors to identify a combination pattern of the first one or more ink colors and the second one or more ink colors; and determines whether to correct amounts of the first one or more inks and amounts of the second one or more inks, based on the identified combination pattern.

16 Claims, 9 Drawing Sheets

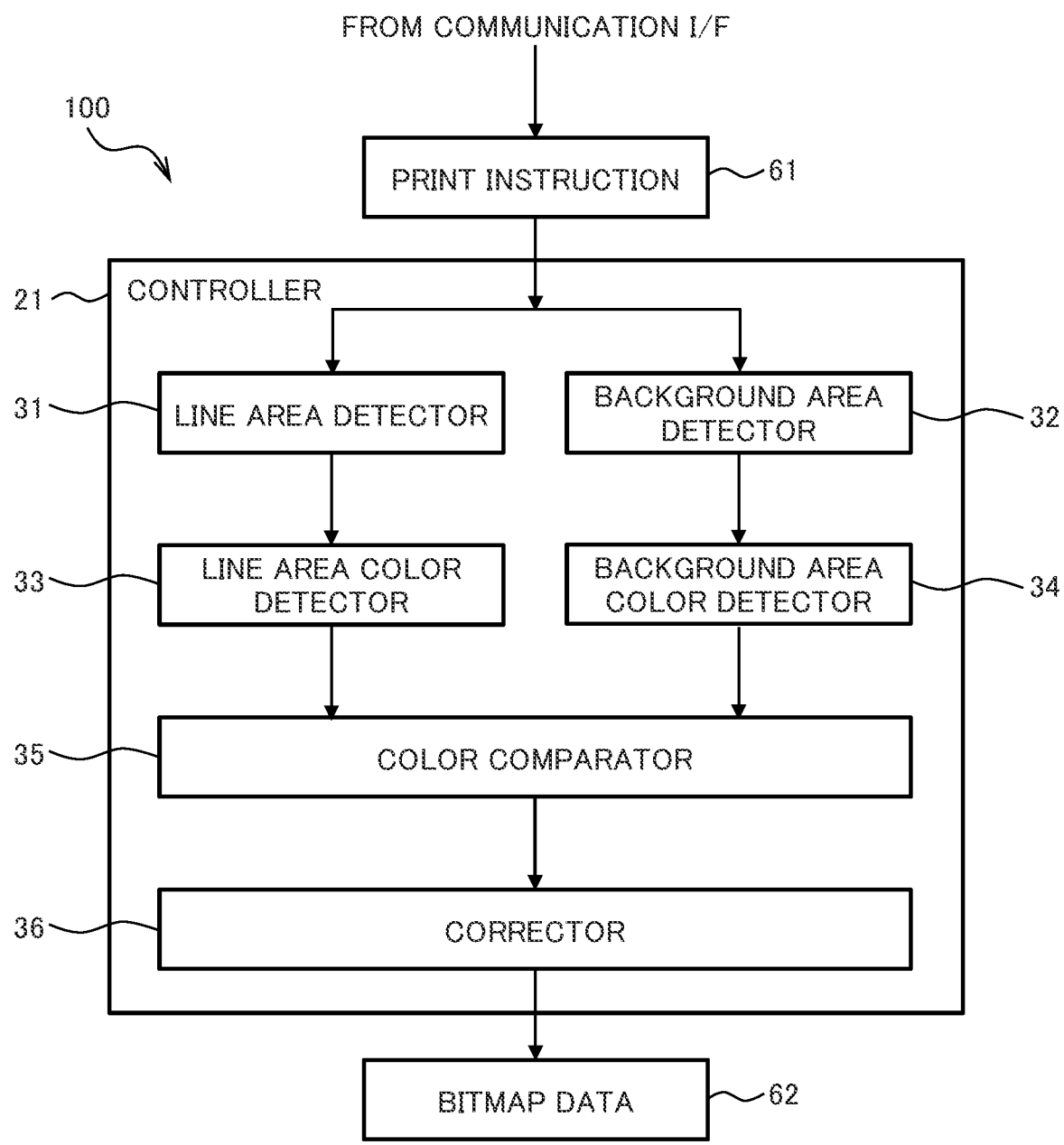

FIG. 3

| Pattern | 1st pattern | 2nd pattern | 3rd pattern | 4th pattern | 5th pattern | 6th pattern | 7th pattern |
|---|---|---|---|---|---|---|---|
| Conceptual image | | | | | | | |
| Line area is of two or more colors or total ink amount is predetermined value or more | No | Yes | No | Yes | Yes | Yes | Yes |
| Background area is of one or more colors | No | No | Yes | Yes | Yes | Yes | Yes |
| Line is printed afterwards | No | No | No | Yes | No | Yes | No |
| Line is printed in advance | Yes | Yes | Yes | No | Yes | No | Yes |
| Inks used in line and inks used in background are different | Yes | Yes | Yes | No | No | Yes | Yes |
| Example 1 — Detection result | — | — | — | Characteristic area Ar1 | Characteristic area Ar2 | Characteristic area Ar1 | Characteristic area Ar2 |
| Example 1 — Correction coefficient | 1.0 | 1.0 | 1.0 | 0.7 | 0.8 | 0.7 | 0.8 |
| Example 2 — Detection result | — | — | — | Characteristic area Ar12 | Characteristic area Ar22 | Characteristic area Ar11 | Characteristic area Ar21 |
| Example 2 — Correction coefficient | 1.0 | 1.0 | 1.0 | 0.7 | 0.8 | 0.5 | 0.6 |

BEFORE CORRECTION

AFTER CORRECTION

BEFORE CORRECTION

AFTER CORRECTION

BEFORE CORRECTION

AFTER CORRECTION

COLOR IMAGE FORMING APPARATUS DETERMINING AN INK CORRECTION AMOUNT FOR REDUCING INK BLEEDING, AND COLOR IMAGE FORMING METHOD

CROSS REFERENCE TO RELATED APPLICATIONS

This application claims foreign priority to Japanese Patent Application No. 2022-091680, filed Jun. 6, 2022, the disclosure of which is incorporated herein by reference.

BACKGROUND

Technological Field

The present invention relates to a color image forming apparatus and to a color image forming method.

Description of the Related Art

Inkjet recording apparatuses that perform printing by an inkjet method are widely used as color image forming apparatuses. A color image forming apparatus may cause ink bleeding occurring in outline portions of lines (characters) when performing printing while superposing plural color inks. Known techniques to reduce the ink bleeding include lightening the boundary portion between a background and a line (character), reducing the size of the shape of dots, and controlling ON/OFF and/or the strength of correction based on the direction and/or width of a line (character). See Patent Literatures 1 to 4, for example.

The approach of the technique described in Patent Literature 1 is to adjust the amount of discharging ink per one time with reference to ink diffusion information based on line width information. This techniques changes the correction amount based on the width of the line.

The approach of the technique described in Patent Literature 2 is to reduce the amount of the ink of an outline portion of a line or change the size of dots. This techniques changes the correction amount based on whether the line is a horizontal line or a vertical line.

The approach of the technique described in Patent Literature 3 is to reduce the density of an area located slightly inward of an outline portion of a line.

The approach of the technique described in Patent Literature 4 is to define an ink bleeding interference reduction area between a first image and a second image to reduce ink bleeding interference.

RELATED ART LITERATURE

Patent Literature

Patent Literature 1: Japanese Patent Publication No. 2021-000793
Patent Literature 2: Japanese Patent Publication No. 2002-292848
Patent Literature 3: Japanese Patent Publication No. 2002-103596
Patent Literature 4: Japanese Patent Publication No. 2000-177151

SUMMARY

The inventors of the present invention have discovered through their research that the amount of ink bleeding occurring in an image (line and/or character) having a background color differs depending on the landing order of the inks used in the background and the line (character). For example, drawing a line (character) first and then a background (including the line drawing portion) produces a smaller amount of ink bleeding. As the conventional techniques attempt to reduce ink bleeding with the same correction amount (same correction method) regardless of the landing order (i.e., regardless of the combination pattern of ink colors of the line area and the background area), it is difficult to optimize the reduction of ink bleeding and there is room for improvement in reducing the amount of ink bleeding occurring in the boundary portions of an image (line and/or character) having a background.

Further, the inventors of the present invention have discovered through their research that the occurrence of a registration deviation may or may not cause an excessive total amount of an ink to be applied to a boundary portion and thus causes a different amount of ink bleeding depending on each case, even in a case where the colors of the background and the line (character) are different. For example, when a background is of a Yellow (Y) color and a line (character) is of a mixture of Cyan and Magenta (C+M) colors and a deviation in registration occurs, the boundary portion is colored in a mixture of Yellow, Cyan, and Magenta (Y+C+M). In such a case, the amount of ink bleeding significantly increases. As the conventional techniques fail to take into account the combination pattern of the ink colors of the line area and the background area, it is difficult to optimize reduction of such ink bleeding and there is room for improvement in further reducing the amount of ink bleeding occurring in the boundary portions of an image (line and/or character) having a background.

The present invention has been made in view of the above-described problems of the conventional techniques and it is an object of the present invention to provide a color image forming apparatus and color image forming method that are capable of reducing the amount of ink bleeding occurring in the boundary portions of an image (line and/or character) having a background.

Solution to Problems

To achieve the above-mentioned object, an aspect of the present invention is a color image forming apparatus including a controller implemented using one or more hardware processors, wherein the controller: detects a line area; detects a background area adjacent to the line area; detects first one or more ink colors of first one or more inks to be used in the line area; detects second one or more ink colors of second one or more inks to be used in the background area; compares the first one or more ink colors and the second one or more ink colors to identify a combination pattern of the first one or more ink colors and the second one or more ink colors; and determines whether to correct amounts of the first one or more inks and amounts of the second one or more inks, based on the identified combination pattern.

To achieve the above-mentioned object, another aspect of the present invention is a method for a color image forming apparatus to form a color image, the color image forming apparatus including a controller implemented using one or more hardware processors, the method including steps of: detecting, by the controller, a line area; detecting, by the controller, a background area adjacent to the line area; detecting, by the controller, first one or more ink colors of first one or more inks to be used in the line area; detecting, by the controller, second one or more ink colors of second one or more inks to be used in the background area; comparing, by the controller, the first one or more ink colors and the second one or more ink colors to identify a combination pattern of the first one or more ink colors and the second one or more ink colors; and determining, by the controller, whether to correct amounts of the first one or more inks and amounts of the second one or more inks, based on the identified combination pattern.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 2 illustrates the configuration of a controller.

FIG. 3 is an explanatory diagram of line area-background area patterns.

DETAILED DESCRIPTION OF EMBODIMENTS

Hereinafter, one or more embodiment s of the present invention will be described with reference to the drawings. However, the scope of the invention is not limited to the disclosed embodiments.

The invention realizes image processing for reducing ink bleeding. In particular, the invention is applicable to inkjet recording apparatuses using water-based inks. Embodiments of the invention corrects the ink amount of boundary portions between a line area and a background area based on a combination pattern of ink colors of the line area and the background area to reduce the ink bleeding occurring in the boundary portions.

Hereinafter, embodiments of the present invention will be described in detail with reference to the drawings. It should be noted that each drawing is shown merely schematically to the extent that the present invention is able to be fully understood. Therefore, the scope of the invention is not limited to the illustrated examples. It should be further noted that, in each drawing, common constituent elements or similar constituent elements are designated by the same reference signs, and duplicate description thereof is omitted.

Herein, the term "chromatic color" used in this application means a color that has hue. In the case of a set of Cyan (C), Magenta (M), Yellow (Y), and Black (K) colors, Cyan (C), Magenta (M), and Yellow (Y) are each a chromatic color, whereas Black (K) is an achromatic color. Herein, the term "chromatic ink" used in this application means an ink of a chromatic color. In the case of a set of Cyan (C), Magenta (M), Yellow (Y), and Black (K) inks, Cyan (C) Magenta (M), and Yellow (Y) inks are each a chromatic ink, whereas Black (K) ink is an achromatic ink. Herein, the term "color ink" or simply "ink" used in this application means any ink of a color. In the case of a set of Cyan (C), Magenta (M), Yellow (Y), and Black (K) inks, these inks are each a color ink.

Configuration of Color Image Forming Apparatus

Figure 1:
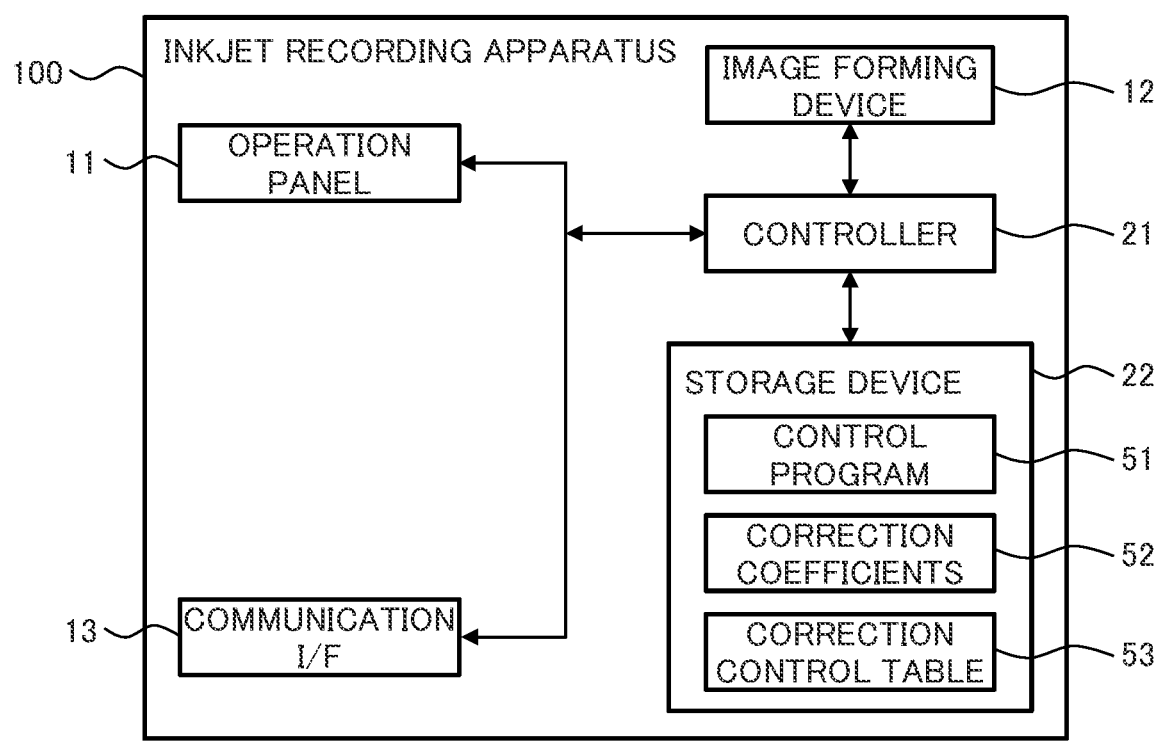
FIG. 1 illustrates the configuration of an inkjet recording apparatus embodied as a color image forming apparatus according to the embodiment.

Hereinbelow, a description will be given of a color image forming apparatus according to an embodiment with reference to FIGS. 1 and 2. The embodiment is described assuming that a color image forming apparatus is constructed as an inkjet recording apparatus using water-based inks. FIG. 1 illustrates the configuration of an inkjet recording apparatus 100 embodied as a color image forming apparatus according to the embodiment.

As illustrated in FIG. 1, the inkjet recording apparatus 100 includes an operation panel 11, an image forming device 12, a communication interface 13, a controller 21, and a storage device 22.

The operation panel 11 allows a user to input various information and displays various information to the user. The operation panel 11 is constructed of a touch panel display or the like with an input function.

The image forming device 12 forms a print image on a recording medium.

Description will be made on the assumption that this embodiment is configured such that the image forming device 12 prints color images using four color inks of Cyan (C), Magenta (M), Yellow (Y), and Black (K).

The communication interface 13 communicates with a device such as an external server. The inkjet recording apparatus 100 performs printing based on a print instruction 61 (see FIG. 2) received from an external device via a server or the like.

The controller 21 controls operations of the parts of the inkjet recording apparatus 100.

The storage device 22 is, for example, constituted of semiconductor memories and the like to store various information.

The various information stored in the storage device 22 includes a control program 51, correction coefficients 52, and correction control table 53.

The control program 51 causes Central Processing Unit(s) (CPU(s)) included in the inkjet recording apparatus 100 to function as the controller 21.

The correction coefficients 52 are to be multiplied to ink amounts included in a print instruction.

The correction control tables 53 are lookup tables used for the correction to be applied to the ink amounts included in the print instruction.

Configuration of Controller

As illustrated in FIG. 2, the control program 51 causes the Central Processing Unit(s) (CPU(s)) included in the inkjet recording apparatus 100 to function as the controller 21, which includes: a line area detector 31, a background area detector 32, a line area color detector 33, a background area color detector 34, a color comparator and a corrector 36.

As illustrated in FIG. 2, the inkjet recording apparatus 100 receives the print instruction 61 by the communication interface 13 (see FIG. 1) from an external device via a server. The print instruction 61 includes image information for each of Cyan (C), Magenta (M), Yellow (Y), and Black (K) colors. Hereinafter these data are sometimes called CMYK data.

The line area detector 31 detects line areas (character areas) from the image information of each color included in the print instruction 61. The line area detector 31 extracts areas where variation in the density occurs using a differential filter and determines areas with high densities as line areas (character areas). As a result of this determination, inner 1 or 2 dots of outline portions of lines (characters) are recognized. The width of a line (character) depends on the size or the like of the differential filter. For example, a total sum of the CMYK data may be used as an input to the differential filter.

The background area detector 32 detects background areas each located adjacent to a line area from the image information of each color included in the print instruction 61. The background area detector 32 extracts areas where variation in the density occurs using a differential filter and determines areas with low densities as background areas. As a result of this determination, inner 1 or 2 dots of outline portions of the background are recognized. The width of the outline portions of the background depends on the size or the like of the differential filter. A total sum of the CMYK data may be used as an input to the differential filter.

The line area color detector 33 detects the colors of the line areas detected by the line area detector 31. The line area color detector 33 determines, for the pixels as detected as the line areas (character areas), the colors of the inks to be used in the line areas (hereinafter sometimes denoted LINE_C, M,Y,K). The line area color detector 33 determines that an ink color (Cin,Min,Yin,Kin) is present if its amount exceeds a predetermined threshold value (LINEth) and that the ink color is absent if its amount is less than or equal to the predetermined threshold value (LINEth). This is represented by the following conditional formulas. That is, an ink color (Cin,Min,Yin,Kin) is assigned a value of 1 if its amount exceeds a predetermined threshold value (LINEth) and is assigned a value of 0 if its amount is less than or equal to the predetermined threshold value (LINEth).

$$\text{LINE\_}C = (C\text{in} > \text{LINE}th)?1:0 \tag{1}$$

$$\text{LINE\_}M = (M\text{in} > \text{LINE}th)?1:0 \tag{2}$$

$$\text{LINE\_}Y = (Y\text{in} > \text{LINE}th)?1:0 \tag{3}$$

$$\text{LINE\_}K = (K\text{in} > \text{LINE}th)?1:0 \tag{4}$$

Here, Cin represents the input amount of Cyan (C) ink to be used in the line area; Min, Magenta (M) ink; Yin, Yellow (Y) ink; and Kin, Black (K) ink.

Here, the portion "LINE_C=(Cin>LINEth)?" of formula (1) represents a condition for determining whether the input ink amount of cyan ink (Cin) exceeds the threshold value (LINEth) for the cyan color of a line area. The same applies to formulas (2), (3), and (4) for the other colors. The right portion "1:0" of formula (1) represents that a value of 1 is outputted when the condition is satisfied (i.e., when the input ink amount of cyan ink (Cin) exceeds the threshold value (LINEth) for the cyan color of a line area) and that a value of 0 is outputted when the condition is not satisfied (i.e., when the input ink amount of cyan ink (Cin) is less than or equal to the threshold value (LINEth) for the cyan color of a line area). The same applies to formulas (2), (3), and (4) for the other colors.

The background area color detector 34 detects the colors of the background areas detected by the background area detector 32. The background area color detector 34 determines, for the pixels detected as the background areas, the colors of the inks to be used in the background areas (hereinafter sometimes denoted BACK_C,M,Y,K). The background area color detector 34 determines that an ink color (Cin,Min,Yin,Kin) is present if its amount exceeds a predetermined threshold value (BACKth) and that the ink color is absent if its amount is less than or equal to the predetermined threshold value (BACKth). This is represented by the following conditional formulas. That is, an ink color (Cin,Min,Yin,Kin) is assigned a value of 1 if its amount exceeds a predetermined threshold value (BACKth) and is assigned a value of 0 if its amount is less than or equal to the predetermined threshold value (BACKth).

$$\text{BACK\_}C = (C\text{in} > \text{BACK}th)?1:0 \tag{5}$$

$$\text{BACK\_}M = (M\text{in} > \text{BACK}th)?1:0 \tag{6}$$

$$\text{BACK\_}Y = (Y\text{in} > \text{BACK}th)?1:0 \tag{7}$$

$$\text{BACK\_}K = (K\text{in} > \text{BACK}th)?1:0 \tag{8}$$

Here, CM represents the input amount of Cyan (C) ink to be used in the background area; Min, Magenta (M) ink; Yin, Yellow (Y) ink; and Kin, Black (K) ink.

Here, the portion "BACK_C=(Cin>BACKth)?" of formula (5) represents a condition for determining whether the input ink amount of cyan ink (Cin) exceeds the threshold value (BACKth) for the cyan color of the background area. The same applies to formulas (6), (7), and (8) for the other colors. The right portion "1:0" of formula (5) represents that a value of 1 is outputted when the condition is satisfied (i.e., when the input ink amount of cyan ink (Cin) exceeds the threshold value (BACKth) for the cyan color of a background area) and that a value of 0 is outputted when the condition is not satisfied (i.e., when the input ink amount of cyan ink (Cin) is less than or equal to the threshold value (BACKth) for the cyan color of a background area). The same applies to formulas (6), (7), and (8) for the other colors.

The color comparator 35 compares the colors in the line area and the colors in the background area. The color comparator 35, by referencing the correction control table 53 (see FIG. 1), compares the colors in the line area (LINE_C, M,Y,K) and the colors in the background area (BACK_C, M,Y,K) to determine a pattern of the line area and the background area (hereinafter sometimes denoted "line area-background area pattern"), and then references the correction coefficients 52 (see FIG. 1) to output correction coefficients (Cx,Mx,Yx,Kx) based on the determined line area-background area pattern to the corrector 36. Description will be made on the assumption that, in the case of this embodiment, the color comparator 35 detects, as a result of the color comparison, characteristic areas Ar1, Ar2, Ar11, Ar12, Ar21, and Ar22 (see FIG. 3) each as a line area-background area pattern, and then the color comparator 35 outputs the correction coefficients (Cx, Mx, Yx, Kx) based on the characteristic area to the corrector 36. The characteristic areas Ar1, Ar2, Ar11, Ar12, Ar21, and Ar22 are described later in the section "Patterns of Line Area and Background Area". The correction coefficients 52 (see FIG. 1) represent correction coefficients Cx,Mx,Yx,Kx for respective color inks. The correction coefficients Cx,Mx,Yx,Kx each represent magnification to be multiplied to the corresponding color data of the image information (CMYK data) included in the print instruction 61 and each take a value of 0.0 to 1.0.

The corrector 36 corrects the amount of the inks based on the line area-background area pattern, which has been determined by the color comparison by the color comparator 35. Description will be made on the assumption that, in the case of this embodiment, the color comparator 35 outputs the correction coefficients (Cx, Mx, Yx, Kx) based on the line area-background area pattern (e.g., characteristic areas Ar1, Ar2, Ar11, Ar12, Ar21, or Ar22 shown in FIG. 3) to the corrector 36, and then the corrector 36 corrects the amounts of the inks by multiplying the correction coefficients (Cx, Mx, Yx, Kx) to respective color data of the image information (CMYK data). Alternatively, the corrector 36 may be configured to: retrieve, from the color comparator 35, the line area-background area pattern information determined by the color comparison (e.g., retrieve information representing the positions and structures of the characteristic areas Ar1, Ar2, Ar11, Ar12, Ar21, and Ar22 shown in FIG. 3); reference the correction coefficients 52 (see FIG. 1) to retrieve the correction coefficients (Cx, Mx, Yx, Kx) based on the line area-background area patterns, which are determined by the color comparison; and multiply the correction coefficients (Cx, Mx, Yx, Kx) to respective color data of the image information (CMYK data), to correct the amounts of the inks.

Subsequent to the correction on the ink amounts by the corrector 36, the corrector 36 generates bitmap data 62 to be used for image printing, based on each color data of the image information included in the print instruction 61. Bitmap data 62 includes pixel-based data for each of Cyan, Magenta, Yellow, and Black colors. Then, the inkjet recording apparatus 100 forms a print image on a recording medium based on the bitmap data 62 by the image forming device 12.

Patterns of Line Area and Background Area

Hereinafter, a description will be given of line area-background area patterns with reference to FIG. 3. FIG. 3 is an explanatory diagram of line area-background area patterns. FIG. 3 represents that correction coefficients are determined based on the combination pattern of the ink colors of the line area and background area. FIG. 3 arranges, in the column direction, a total of seven kinds of line area-background area patterns of 1st to 7th patterns, arranges, in the row direction, items such as conditions of a line area and/or a background area, result of detecting a characteristic area, and correction coefficients, and represents combination examples of items for each pattern. In FIG. 3, "Yes" represents that the pattern meets the corresponding condition and "No" represents that the pattern fails to meet the corresponding condition.

FIG. 3 arranges the following items in the row direction.

The first row represents a conceptual image (construction) of the pattern for each of the 1st to 7th patterns. The conceptual image of each pattern will be described in detail later with reference to FIGS. 4A to 4G.

The second row represents logical values of a condition of line area such that "line area is of two or more colors or total ink amount is predetermined value or more (the line area is constituted of two or more colors or total ink amount is greater than or equal to a predetermined value)".

The third row represents logical values of a condition of background area such that "background area is of one or more colors (the background area is constituted of one or more colors)".

The fourth row represents logical values of a condition of an ink landing order such that "line is printed afterward" (the line area is printed after the background area).

The fifth row represents logical values of a condition of ink landing order such that "line is printed in advance" (the line area is printed in advance of the background area).

The sixth row represents logical values of a condition such that "Inks used in line and inks used in background are different" (the inks used in the line area and the inks to be used in the background area are different).

The seventh row shows examples of "detection result" and "correction coefficient" in the case of Example 1 described later.

The eighth row shows examples of "detection result" and "correction coefficient" in the case of Example 2 described later.

FIGS. 4A to 4G are each an explanatory diagram of a line area and a background area. FIGS. 4A to 4G respectively illustrate conceptual images (constructions) of the 1st to 7th patterns represented in FIG. 3. FIGS. 4A to 4G illustrate examples in which the inkjet recording apparatus 100 records (applies) a first chromatic ink 81 (see FIGS. 4A to 4G), a second chromatic ink 82 (see FIGS. 4B to 4G), and a third chromatic ink 83 (see FIGS. 4F and 4G) onto a recording medium 80. An ink closer to the recording medium 80 (an ink located in a lower layer) precedently lands on the recording medium 80. Here, description will be given of a case where the first chromatic ink 81 is a Cyan (C) ink, the second chromatic ink 82 is a Magenta (M) ink, the third chromatic ink 83 is a Yellow (Y) ink.

Figure 4A:
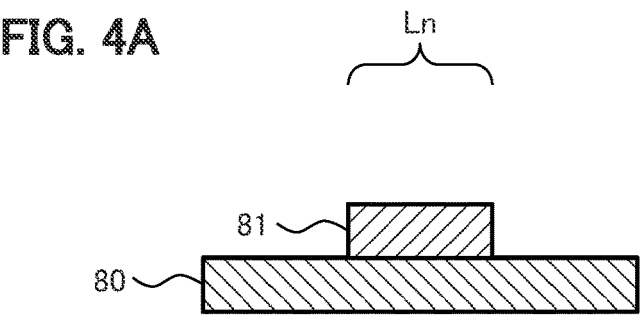
FIG. 4A is an explanatory diagram (1) of a line area and a background area.

As illustrated in FIG. 4A, the 1st pattern is a pattern such that the first chromatic ink 81 is ejected to an area Ln on the recording medium 80. In this case, the line area corresponds to the area Ln and is formed of the first chromatic ink 81; and no background area is present.

Figure 4B:
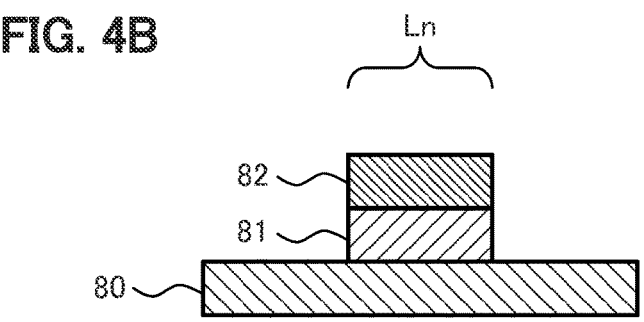
FIG. 4B is an explanatory diagram (2) of a line area and a background area.

As illustrated in FIG. 4B, the 2nd pattern is a pattern such that the first chromatic ink 81 and the second chromatic ink 82 are ejected in this order to an area Ln on the recording medium 80. In this case, the line area corresponds to the area Ln and is formed of the first chromatic ink 81 and the second chromatic ink 82; and no background area is present.

Figure 4C:
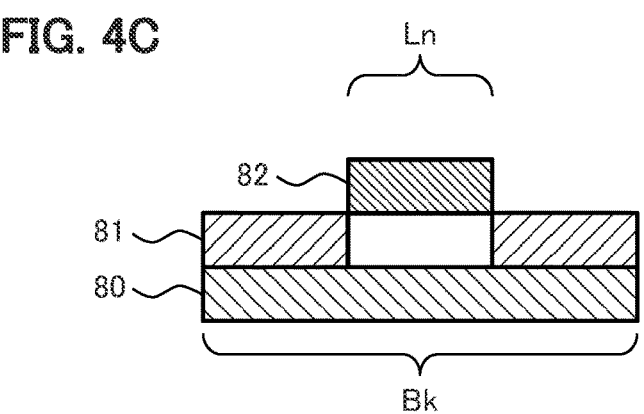
FIG. 4C is an explanatory diagram (3) of a line area and a background area.

As illustrated in FIG. 4C, the 3rd pattern is a pattern such that the first chromatic ink 81 is ejected with a partially absent portion to an area Bk on the recording medium 80 and then the second chromatic ink 82 is ejected to an area Ln corresponding to the partially absent portion. In this case, the line area corresponds to the area Ln and is formed of the second chromatic ink 82; and the background area corresponds to the area Bk excluding the area Ln and is formed of the first chromatic ink 81.

Figure 4D:
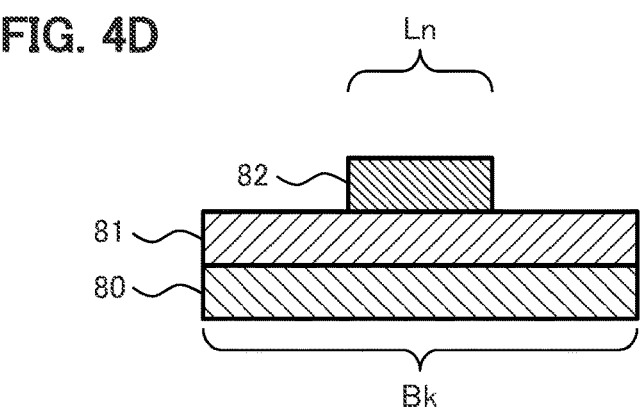
FIG. 4D is an explanatory diagram (4) of a line area and a background area.

As illustrated in FIG. 4D, the 4th pattern is a pattern such that the first chromatic ink 81 is ejected to an area Bk on the recording medium 80 and then the second chromatic ink 82 is ejected onto the first chromatic ink 81 in an area Ln included in the area Bk. In this case, the line area corresponds to the area Ln and is formed of the first chromatic ink 81 and the second chromatic ink 82; and the background area corresponds to the area Bk excluding the area Ln and is formed of the first chromatic ink 81.

Figure 4E:
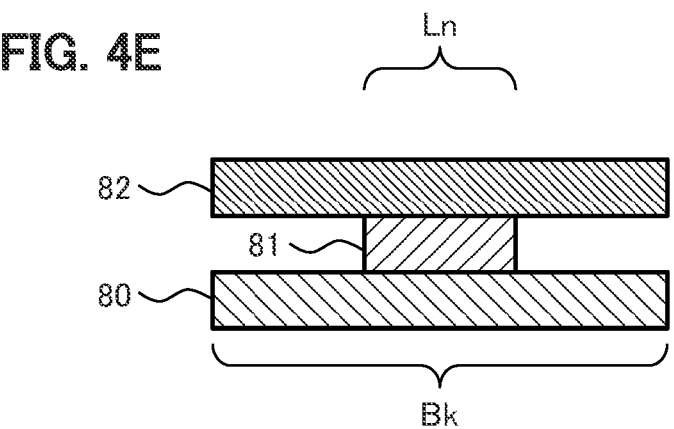
FIG. 4E is an explanatory diagram (5) of a line area and a background area.

As illustrated in FIG. 4E, the 5th pattern is a pattern such that the first chromatic ink 81 is ejected to an area Ln on the recording medium 80 and then the second chromatic ink 82 is ejected to an area Bk including the area Ln so as to cover the first chromatic ink 81. In this case, the line area corresponds to the area Ln and is formed of the first chromatic ink 81 and the second chromatic ink 82; and the background area corresponds to the area Bk excluding the area Ln and is formed of the second chromatic ink 82.

Figure 4F:
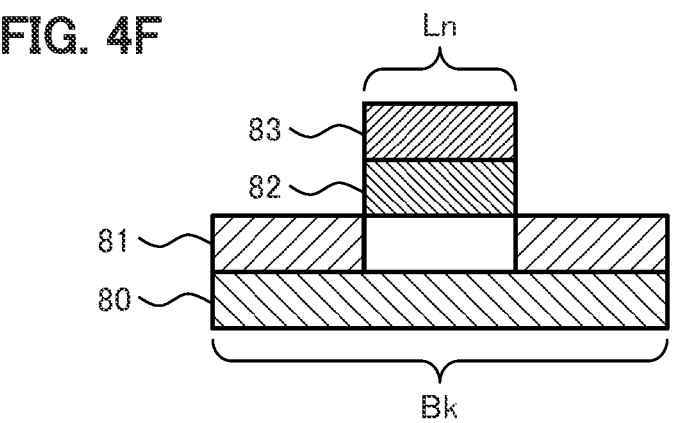
FIG. 4F is an explanatory diagram (6) of a line area and a background area.

As illustrated in FIG. 4F, the 6th pattern is a pattern such that the first chromatic ink 81 is ejected with a partially absent portion in an area Bk on the recording medium 80 and then the second chromatic ink 82 and the third chromatic ink 83 are ejected in this order to an area Ln corresponding to the partially absent portion. In this case, the line area corresponds to the area Ln and is formed of the second chromatic ink 82 and the third chromatic ink 83; and the background area corresponds to the area Bk excluding the area Ln and is formed of the first chromatic ink 81.

Figure 4G:
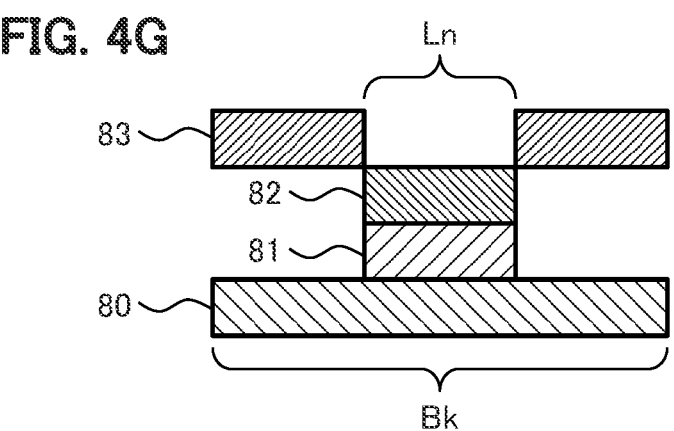
FIG. 4G is an explanatory diagram (7) of a line area and a background area.

As illustrated in FIG. 4G, the 7th pattern is a pattern such that the first chromatic ink 81 and the second chromatic ink 82 are ejected in this order to an area Ln on the recording medium 80, and then, in an area Bk including the area Ln, the third chromatic ink 83 is ejected with a partially absent portion corresponding to the area Ln. In this case, the line area corresponds to the area Ln and is formed of the first chromatic ink 81 and the second chromatic ink 82; and the background area corresponds to the area Bk excluding the area Ln and is formed of the third chromatic ink 83.

Returning to FIG. 3, the second to sixth rows of the 1st pattern (see FIG. 4A) are respectively populated with "No" (fails to meet the condition), "No" (fails to meet the condition), "No" (fails to meet the condition), "Yes" (meets the condition), and "Yes" (meets the condition).

The second to sixth rows of the 2nd pattern (see FIG. 4B) are respectively populated with "Yes" (meets the condition). "No" (fails to meet the condition), "No" (fails to meet the condition), "Yes" (meets the condition), and "Yes" (meets the condition).

The second to sixth rows of the 3rd pattern (see FIG. 4C) are respectively populated with "No" (fails to meet the condition), "Yes" (meets the condition), "Yes" (meets the condition), "No" (fails to meet the condition), and "Yes" (meets the condition).

The second to sixth rows of the 4th pattern (see FIG. 4D) are respectively populated with "Yes" (meets the condition), "Yes" (meets the condition), "Yes" (meets the condition), "No" (fails to meet the condition), and "No" (fails to meet the condition).

The second to sixth rows of the 5th pattern (see FIG. 4E) are respectively populated with "Yes" (meets the condition), "Yes" (meets the condition), "No" (fails to meet the condition), "Yes" (meets the condition), and "No" (fails to meet the condition).

The second to sixth rows of the 6th pattern (see FIG. 4F) are respectively populated with "Yes" (meets the condition), "Yes" (meets the condition), "Yes" (meets the condition), "No" (fails to meet the condition), and "Yes" (meets the condition).

The second to sixth rows of the 7th pattern (see FIG. 4G) are respectively populated with "Yes" (meets the condition), "Yes" (meets the condition), "No" (fails to meet the condition), "Yes" (meets the condition), and "Yes" (meets the condition).

Example 1

Example 1 is a case where the color comparator 35 detects, as a result of (color comparison by) the color comparator 35 comparing the ink color(s) of the line area and the ink color(s) of the background area, characteristic areas Ar1 and Ar2, which meet the later-described conditions, and the corrector 36 corrects the amounts of inks of the boundary portions between the line area and the background area in each of the characteristic areas Ar1 and Ar2. Here, the description will be made on the assumption that although only three color inks of the first chromatic ink 81 of Cyan (C), the second chromatic ink 82 of Magenta (M), and the third chromatic ink 83 of Yellow (Y) are indicated in the patterns illustrated in FIGS. 3 and 4A to 4G, the inkjet recording apparatus 100 records inks of Cyan (C), Magenta (M), Yellow (Y), and Black (K) colors onto the recording medium (paper) in order.

In the case of Example 1, the corrector 36 sets a larger density reduction amount for the characteristic area Ar1 than the characteristic area Ar2 when correcting the ink amounts. However, as described in Supplemental Description section later, when the line area (character area) and the background area in a characteristic area are defined in the opposite manner, a larger density reduction amount is set for the characteristic area Ar2 than the characteristic area Ar1.

A "characteristic area Ar1" is an area where the ink(s) to be used in the line area include a chromatic ink to be printed after the ink(s) to be used in the background area. In other words, a "characteristic area Ar1" is an area where the ink(s) to be used in the line area include a chromatic ink with which overwriting is to be performed in a state each of the line area and the background area has been drawn with another ink.

A "characteristic area Ar2" is an area where the ink(s) to be used in the line area include a chromatic ink to be printed in advance of the ink(s) to be used in the background area. In other words, a "characteristic area Ar2" is an area where the ink(s) to be used in the line area include a chromatic ink to be printed directly on the paper in a state neither line area nor background area has been drawn.

In a characteristic area Ar1, the ink(s) to be used in the line area (character area) include a chromatic ink to be printed after the ink(s) to be used in the background area.

In a characteristic area Ar2, the ink(s) to be used in the line area (character area) include a chromatic ink to be printed in advance of the ink(s) to be used in the background area.

In characteristic areas Ar1 and Ar2, two or more of LINE_C, M, Y, K defined in the above-described formulas (1) to (4) yields a value of 1. In characteristic areas Ar1 and Ar2, one or more of BACK_C, M, Y, K defined in the above-described formulas (5) to (8) yields a value of 1. The color comparator 35 identifies characteristic areas Ar1 and Ar2 each using a logical condition including LINE_C, M, Y, K and BACK_C, M, Y, K.

The logical condition for identifying a characteristic area Ar1 may be such that there exists a chromatic color (C, M, or Y) which meets the condition LINE_*=1 and the chromatic ink of that chromatic color lands after the ink(s) of the colors(s) meeting the condition BACK_*=1. The logical condition for identifying a characteristic area Ar2 may be such that there exists a chromatic color (C, M, or Y) which meets the condition LINE_*=1 and the chromatic ink of that chromatic color lands in advance of the ink(s) of the colors(s) meeting the condition BACK_*=1. Here "*" represent any one of C (Cyan), M (Magenta), Y (Yellow), and K (Black) colors. However, when testing the presence of a chromatic color with the condition LINE_*=1, "*" represent any one of C (Cyan), M (Magenta), and Y (Yellow). The same applies to the same notations below.

When the combination of the ink colors of a line area and the ink colors of a background area meet none of the conditions for the characteristic areas Ar1 and Ar2, the pattern of the combination is recognized as a pattern other than the patterns of the characteristic areas Ar1 and Ar2.

In the case of Example 1 in FIG. 3, when the image forming pattern of an area is one of the 1st to 3rd patterns, the color comparator 35 detects a pattern other than the characteristic areas Ar1 and Ar2. In these cases, the value of the correction coefficient is set to 1.0. In that area, the corrector 36 multiplies the correction coefficient taking a value of 1.0 to the ink amounts at the boundary portion between the line area and the background area. Regarding the 1st pattern area, as there is no background area and the line area is constituted of one color, the area is determined as being a pattern other than characteristic areas Ar1 and Ar2, and correction is not performed to any color ink. Regarding the 2nd pattern area, as there is no background area, the area is determined as being a pattern other than characteristic areas Ar1 and Ar2, and correction is not performed to any color ink. Regarding the 3rd pattern area, although there is a background area, as the line area is constituted of one color, the area is determined as being a pattern other than characteristic areas Ar1 and Ar2 and correction is not performed to any color ink.

When the image forming pattern of an area is of the 4th or 6th pattern, the color comparator 35 determines the area as being a characteristic area Ar1. In this case, the value of the correction coefficient is set to 0.7. The corrector 36 multiplies the correction coefficient taking a value of 0.7 to the ink amounts at the boundary portion between the line area and the background area of the characteristic area Ar1. For example, for each of the pixels of the input image in the boundary portion between the line area and the background area of the determined characteristic area Ar1, for each of the ink amounts which are determined as meeting the condition LINE_C,M,Y,K=1 or the condition BACK_C,M,Y,K=1, the corrector 36 multiplies the correction coefficient taking a value of 0.7 to the ink amount. In the cases of the 4th and 6th patterns, as there is a background area, the line area is constituted of two colors, and the line area includes a chromatic ink to be printed after the background, the area is determined as being a characteristic area Ar1 and correction is performed on the inks in the boundary portion between the line area and the background area of the characteristic area Ar1.

When the image forming pattern of an area is of the 5th or 7th pattern, the color comparator 35 determines the area as being a characteristic area Ar2. In this case, the value of the correction coefficient is set to 0.8. The corrector 36 multiplies the correction coefficient taking a value of 0.8 to the ink amounts at the boundary portion between the line area and the background area of the characteristic area Ar2. For example, for each of the pixels of the input image in the boundary portion between the line area and the background area of the determined characteristic area Ar2, for each of the ink amounts which are determined as meeting the condition LINE_C,M,Y,K=1 or the condition BACK_C,M,Y,K=1, the corrector 36 multiplies the correction coefficient taking a value of 0.8 to the ink amount. In the cases of the 5th and 7th patterns, as there is a background area, the line area is constituted of two colors, and the line area includes a chromatic ink to be printed in advance of the background, the area is determined as being a characteristic area Ar2, then correction is performed on the inks in the boundary portion between the line area and the background area of the characteristic area Ar2.

Example 2

Example 2 is an example of defining ink bleeding conditions more finely than Example 1. In the case of Example 2, the color comparator 35 detects, as a result of (color comparison by) the color comparator 35 comparing the ink color(s) of the line area and the ink color(s) of the background area, characteristic areas Ar11, Ar12, Ar21, and Ar22, which meet the later-described conditions, and the corrector 36 corrects the ink amounts on the boundary portion between the line area and the background area in the characteristic area Ar11, Ar12, Ar21, and Ar22. Here, the description will be made on the assumption that the inkjet recording apparatus 100 records inks of Cyan (C), Magenta (M), Yellow (Y), and Black (K) colors onto the recording medium (paper) in order.

Description will be given on the assumption that, in the case of Example 2, when the corrector 36 corrects the ink amounts, the corrector 36 sets a larger density reduction amount for the characteristic area Ar11 than the characteristic area Ar12, sets a larger density reduction amount for the characteristic area Ar21 than the characteristic area Ar22, and sets a larger density reduction amount for the characteristic area Ar12 than the characteristic area Ar22. However, as described in Supplemental Description section later, when the line area (character area) and the background area in a characteristic area are defined in the opposite manner, the corrector 36 is configured such that when correcting the ink amounts, the corrector 36 sets a larger density reduction amount for the characteristic area Ar12 than the characteristic area Ar11, sets a larger density reduction amount for the characteristic area Ar22 than the characteristic area Ar21, and sets a larger density reduction amount for the characteristic area Ar21 than the characteristic area Ar11.

A "characteristic area Ar11" is an area where the ink(s) to be used in the line area include a chromatic ink to be printed after the inks to be used in the background area and do not include any ink to be used in the background area. In other words, a "characteristic area Ar11" is an area such that the ink(s) to be used in the line area include a chromatic ink with which overwriting is to be performed in a state each of the line area and the background area has been drawn with another ink and that the ink(s) to be used in the line area do not include any ink to be used in the background area.

A "characteristic area Ar12" is an area where the ink(s) to be used in the line area include a chromatic ink to be printed after the ink(s) to be used in the background area and include an ink to be used in the background area. In other words, a "characteristic area Ar12" is an area such that the ink(s) to be used in the line area include a chromatic ink with which overwriting is to be performed in a state each of the line area and the background area has been drawn with another ink and that the ink(s) to be used in the line area include an ink to be used in the background area.

A "characteristic area Ar21" is an area where the ink(s) to be used in the line area include a chromatic ink to be printed in advance of the ink(s) to be used in the background area and do not include any ink to be used in the background area. In other words, a "characteristic area Ar21" is an area such that the ink(s) to be used in the line area include a chromatic ink to be printed directly on the paper in a state neither line area nor background area has been drawn and that the ink(s) to be used in the line area do not include any ink to be used in the background area.

A "characteristic area Ar22" is an area where the ink(s) to be used in the line area include a chromatic ink to be printed in advance of the ink(s) to be used in the background area and include an ink to be used in the background area. In other words, a "characteristic area Ar22" is an area such that the ink(s) to be used in the line area (character area) include a chromatic ink to be printed directly on the paper in a state neither line area nor background area has been drawn and that the ink(s) to be used in the line area include an ink to be used in the background area.

In a characteristic area Ar11, the ink(s) to be used in the line area (character area) include a chromatic ink to be printed after the ink(s) to be used in the background area. In addition, the ink(s) to be used in the background area and the ink(s) to be used in the line area (character area) are different.

In a characteristic area Ar12, the ink(s) to be used in the line area (character area) include a chromatic ink to be printed after the ink(s) to be used in the background area. In addition, there is an ink to be used in both the line area (character area) and the background area.

In a characteristic area Ar21, the ink(s) to be used in the line area (character area) include a chromatic ink to be printed in advance of the ink(s) to be used in the background area. In addition, the ink(s) to be used in the background area and the ink(s) to be used in line area (character area) are different.

In a characteristic area Ar22, the ink(s) to be used in the line area (character area) include a chromatic ink to be printed in advance of the ink(s) to be used in the background area. In addition, there is an ink to be used in both the line area (character area) and the background area.

In each of the characteristic areas Ar11, Ar12, Ar21, and Ar22, two or more of LINE_C, M, Y, K defined in the above-described formulas (1) to (4) yield a value of 1. In each of the characteristic areas Ar11, Ar12, Ar21, and Ar22, one or more of BACK_C,M,Y,K defined in the above-described formulas (5) to (8) yield a value of 1. The color comparator 35 identifies characteristic areas Ar11, Ar12, Ar21, and Ar22 using logical conditions including LINE_C, M, Y, K and BACK_C, M, Y, K.

The logical condition for identifying a characteristic area Ar11 may be such that there exists a chromatic color (C, M, or Y) which meets the condition LINE_*=1 and the chromatic ink of that chromatic color lands after the ink(s) of the colors(s) meeting the condition BACK_*=1 and that the color(s) meeting the condition BACK_*=1 and the color(s) meeting the condition LINE_*=1 are different. The logical condition for identifying a characteristic area Ar12 may be such that there exists a chromatic color (C, M, or Y) which meets the condition LINE_*=1 and the chromatic ink of that chromatic color lands after the ink(s) of the colors(s) meeting the condition BACK_*=1 and that there exists a color meeting both the condition BACK_*=1 and the condition LINE_*=1. The logical condition for identifying a characteristic area Ar21 may be such that there exists a chromatic color (C, M, or Y) which meets the condition LINE_*=1 and the chromatic ink of that chromatic color lands in advance of the ink(s) of the colors(s) meeting the condition BACK_*=1 and that the color(s) meeting the condition BACK_*=1 and the color(s) meeting the condition LINE_*=1 are different. The logical condition for identifying a characteristic area Ar22 may be such that there exists a chromatic color (C, M, or Y) which meets the condition LINE_*=1 and the chromatic ink of that chromatic color lands in advance of the ink(s) of the colors(s) meeting the condition BACK_*=1 and that there exists a color meeting both the condition BACK_*=1 and the condition LINE_*=1.

When the combination of the ink color(s) of a line area and the ink color(s) of a background area meet none of the conditions for the characteristic areas Ar11, Ar12, Ar21, and Ar22, the pattern of the combination is recognized as a pattern other than the patterns of the characteristic areas Ar11, Ar12, Ar21, and Ar22.

In the case of Example 2 in FIG. 3, when the image forming pattern of an area is one of the 1st to 3rd patterns, the color comparator 35 detects a pattern other than the characteristic areas Ar11, Ar12, Ar21, and Ar22. In these cases, the value of the correction coefficient is set to 1.0. In that area, the corrector 36 multiplies the correction coefficient taking a value of 1.0 to the ink amount at the boundary portion between the line area and the background area. Regarding the 1st pattern area, as there is no background area and the line area is constituted of one color, the area is determined as being of a pattern other than the characteristic areas Ar11, Ar12, Ar21, and Ar22, and correction is not performed to any color ink. Regarding the 2nd pattern area, as there is no background area, the area is determined as being of a pattern other than the characteristic areas Ar11, Ar12, Ar21, and Ar22, and correction is not performed to any color ink. Regarding the 3rd pattern area, although there is a background area, as the line area is constituted of one color, the area is determined as being of a pattern other than the characteristic areas Ar11, Ar12, Ar21, and Ar22, and correction is not performed to any color ink.

When the image forming pattern of an area is of the 4th pattern, the color comparator 35 determines the area as being a characteristic area Ar12. In this case, the value of the correction coefficient is set to 0.7. The corrector 36 multiplies the correction coefficient taking a value of 0.7 to the ink amounts of the boundary portion between the line area and the background area of the characteristic area Ar12. For example, for each of the pixels in the boundary portion between the line area and the background area of the characteristic area Ar12 determined in the input image, for each of the ink amounts which are determined as meeting the condition LINE_C,M,Y,K=1 or the condition BACK_C,M,Y,K=1, the corrector 36 multiplies the correction coefficient taking a value of 0.7 to the ink amount. In the case of the 4th pattern area, as a background area is present, the line area is constituted of two colors, and the line area includes a chromatic ink to be printed after the background area, the area is determined as being a characteristic area Ar12 and correction is performed on the inks of the boundary portion between the line area and the background area of the characteristic area Ar12.

When the image forming pattern of an area is of the 5th pattern, the color comparator 35 determines the area as being a characteristic area Ar22. In this case, the value of the correction coefficient is set to 0.8. The corrector 36 multiplies the correction coefficient taking a value of 0.8 to the ink amounts of the boundary portion between the line area and the background area of the characteristic area Ar22. For example, for each of the pixels in the boundary portion between the line area and the background area of the characteristic area Ar22 determined in the input image, for each of the ink amounts which are determined as meeting the condition LINE_C,M,Y,K=1 or the condition BACK_C,M,Y,K=1, the corrector 36 multiplies the correction coefficient taking a value of 0.8 to the ink amount. In the case of the 5th pattern area, as a background area is present, the line area is constituted of two colors, and the line area includes a chromatic ink to be printed in advance of the background area, the area is determined as being a characteristic area Ar22 and correction is performed on the inks of the boundary portion between the line area and the background area of the characteristic area Ar22.

When the image forming pattern of an area is of the 6th pattern, the color comparator 35 determines the area as being a characteristic area Ar11. In this case, the value of the correction coefficient is set to 0.5. The corrector 36 multiplies the correction coefficient taking a value of 0.5 to the ink amounts of the boundary portion between the line area and the background area of the characteristic area Ar11. For example, for each of the pixels in the boundary portion between the line area and the background area of the characteristic area Ar11 determined in the input image, for each of the ink amounts which are determined as meeting the condition LINE_C,M,Y,K=1 or the condition BACK_C,M,Y,K=1, the corrector 36 multiplies the correction coefficient taking a value of 0.5 to the ink amount. In the case of the 6th pattern area, as a background area is present, the line area is constituted of two colors, and the line area includes a chromatic ink to be printed after the background area, the area is determined as being a characteristic area Ar11 and correction is performed on the inks of the boundary portion between the line area and the background area of the characteristic area Ar11.

When the image forming pattern of an area is of the 7th pattern, the color comparator 35 determines the area as being a characteristic area Ar21. In this case, the value of the correction coefficient is set to 0.6. The corrector 36 multiplies the correction coefficient taking a value of 0.6 to the ink amounts of the boundary portion between the line area and the background area of the characteristic area Ar21. For example, for each of the pixels in the boundary portion between the line area and the background area of the characteristic area Ar21 determined in the input image, for each of the ink amounts which are determined as meeting the condition LINE_C,M,Y,K=1 or the condition BACK_C,M,Y,K=1, the corrector 36 multiplies the correction coefficient taking a value of 0.6 to the ink amount.

In the case of the 7th pattern area, as a background area is present, the line area is constituted of two colors, and the line area includes a chromatic ink to be printed in advance of the background area, the area is determined as being a characteristic area Ar21 and correction is performed on the inks of the boundary portion between the line area and the background area of the characteristic area Ar21.

Examples Before and After Correction

Figure 5A:
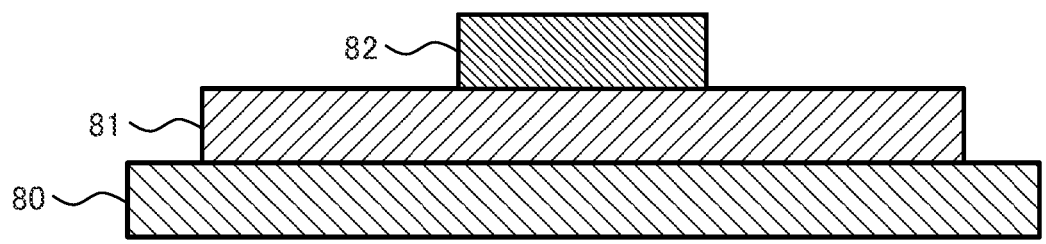
FIG. 5A illustrates a conceptual image of an image before correction.
Figure 5B:
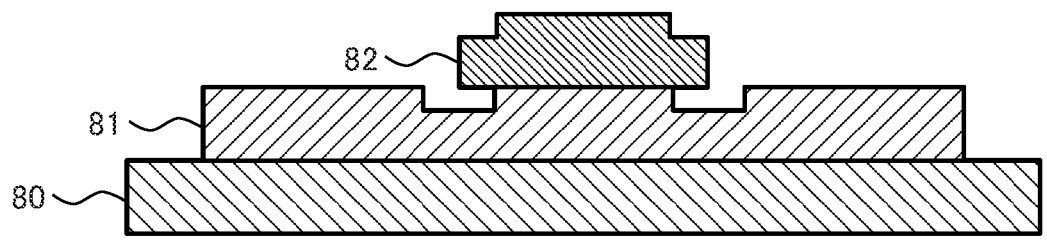
FIG. 5B illustrates a conceptual image of an image after correction.
Figure 6A:
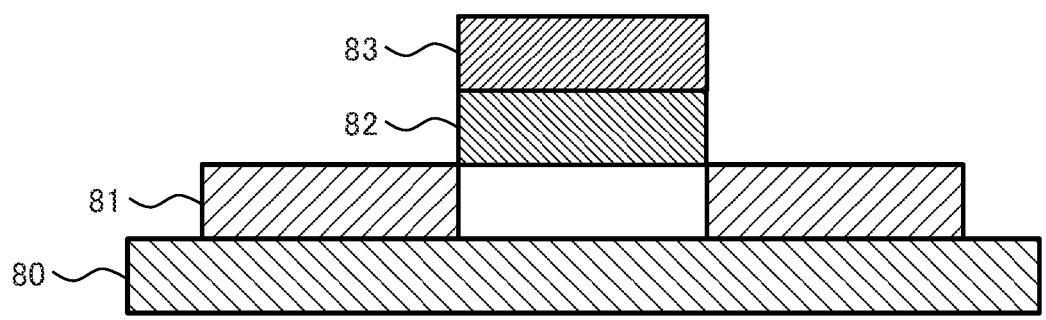
FIG. 6A illustrates a conceptual image of an image before correction.
Figure 6B:
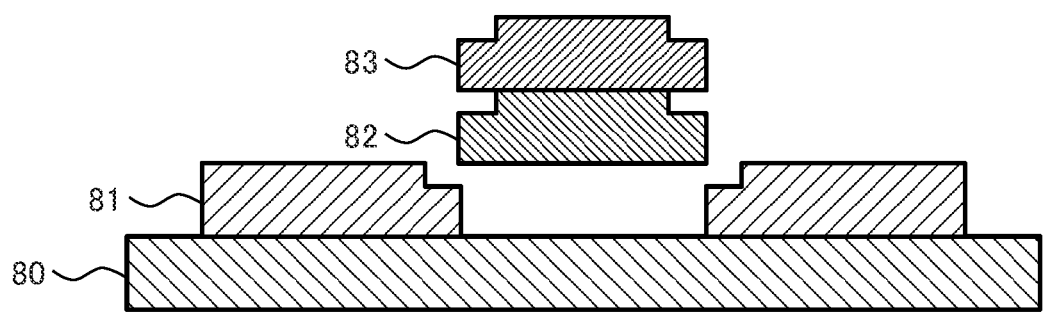
FIG. 6B illustrates a conceptual image of an image after correction.
Figure 7A:
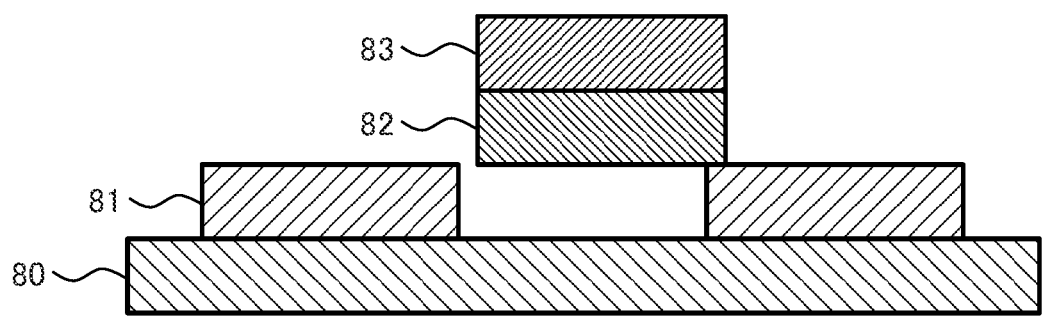
FIG. 7A illustrates a conceptual image of an image before correction.
Figure 7B:
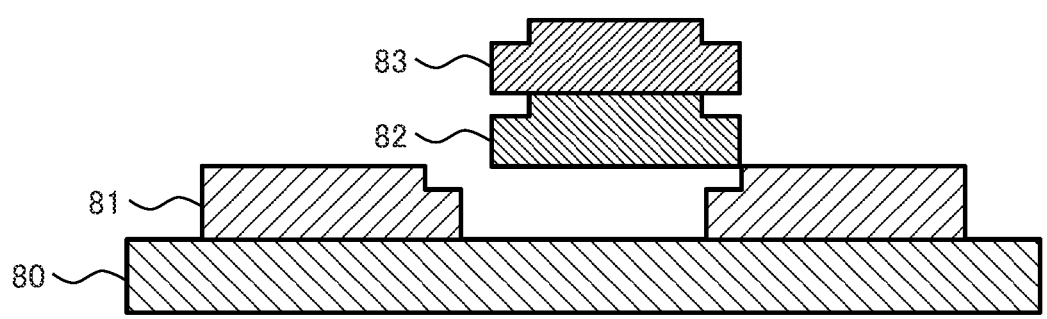
FIG. 7B illustrates a conceptual image of an image after correction.

Hereinbelow, a description will be given of examples before and after correction with reference to FIGS. 5A to 7B. FIGS. 5A, 6A, and 7A are each an explanatory diagram illustrating a case before correction. FIGS. 5B, 6B, and 7B are each an explanatory diagram illustrating a case after correction. FIGS. 5A to 7B each illustrate a conceptual image of a recording medium to which inks have been applied, for a case before or after correction.

FIG. 5A illustrates an example of an image formed based on the image information before correction. In the example illustrated in FIG. 5A, a first chromatic ink 81 forming a background area is disposed on a recording medium 80; and a second chromatic ink 82 forming a line area is disposed on the first chromatic ink 81. Here, an assumption is made that the first chromatic ink 81 is a Cyan (C) ink and the second chromatic ink 82 is a Magenta (M) ink. That is, the color of the background area is the Cyan color of the first chromatic ink 81 and the color of the line area (character area) is a blue color (Cyan color of the first chromatic ink 81+Magenta color of the second chromatic ink 82)

FIG. 5B illustrates an example of an image formed based on the image information obtained by correcting the image information on which the example illustrated in FIG. 5A is based. The example illustrated in FIG. 5B shows that, in the line area (character area), the density of the second chromatic ink 82 of Magenta color in an inner edge (1 to 2 pixels) of each outline portion of the second chromatic ink 82 is reduced; and the density of the first chromatic ink 81 of Cyan color in inner and outer edges (1 to 2 pixels for each) of each outline portion of the first chromatic ink 81 is reduced. As a result, in the example shown in FIG. 5B, the amount of the first chromatic ink 81 that forms the background area and the amount of the second chromatic ink 82 that forms the line area are reduced in the boundary portion between the background area and the line area. Note that the area to which correction is performed is not limited to this example. For example, it is conceivable to widen the area to which the correction is performed or limit the area to which the correction is performed only to the inner edge of the outline portion of the line area (character area). The same applies to the examples illustrated in FIGS. 6A to 7B. In addition, the method of correction is also not limited to this example. For example, it is conceivable to reduce the size of a droplet of the ink (per 1 dot) to be discharged. The same applies to the examples illustrated in FIGS. 6A to 7B.

FIGS. 6A and 6B illustrate an example where the ink(s) used in a background area and the ink(s) used in a line area (character area) are different. Such a case tends to broaden an area where ink bleeding occurs as illustrated in below-described FIG. 8. FIG. 6A illustrates an example of an image formed based on the image information before correction. In the example illustrated in FIG. 6A, a first chromatic ink 81 having an partially absent portion and forming a background area is disposed on a recording medium 80; and a second chromatic ink 82 and a third chromatic ink 83 that form a line area are disposed on the partially absent portion of the first chromatic ink 81. Here, an assumption is made that the first chromatic ink 81 is a Cyan (C) ink; the second chromatic ink 82 is a Magenta (M) ink; and the third chromatic ink 83 is a Yellow (Y) ink. That is, the color of the background area is the Cyan color of the first chromatic ink 81 and the color of the line area (character area) is a red color (Magenta color of the second chromatic ink 82+Yellow color of the third chromatic ink 83).

FIG. 6B illustrates an example of an image formed based on the image information obtained by correcting the image information on which the example illustrated in FIG. 6A is based. The example illustrated in FIG. 6B shows that, in the line area (character area): the density of the third chromatic ink 83 of Yellow color in the inner edge (1 to 2 pixels) of each outline portion of the third chromatic ink 83 is reduced; the density of the second chromatic ink 82 of Magenta color in the inner edge (1 to 2 pixels) of each outline portion of the second chromatic ink 82 is reduced; and the density of the first chromatic ink 81 of Cyan color in the inner edge (1 to 2 pixels) of each outline portion of the first chromatic ink 81 is reduced. As a result, in the example shown in FIG. 6B, the amount of the first chromatic ink 81 that forms the background area and the amounts of the second chromatic ink 82 and the third chromatic ink 83 that together form the line area are reduced in the boundary portion between the background area and the line area.

FIG. 7A illustrates an example of an image formed based on the image information before correction. FIG. 7A illustrates a state where a deviation has occurred in the registration of the inks in the example illustrated in FIG. 6A. In the example illustrated in FIG. 6A, no deviation has occurred in the registration of the inks. Comparing the example illustrated in FIG. 6A and the example illustrated in FIG. 5A, in the boundary portion between the background area and the line area, the total amount of the inks in the background area and the total amount of the inks in the line area are substantially the same, and thus the amount of ink bleeding will be substantially the same. Whereas, in the example illustrated in FIG. 7A, with respect to the first chromatic ink 81 of Cyan color of the background area, the second chromatic ink 82 of Magenta color and the third chromatic ink 83 of Yellow color in the line area deviate right. In other words, in the example illustrated in FIG. 7A, the three color inks are superposed locally on the right side of the boundary portion of the line area. As a result, in the example illustrated in FIG. 7A, the total amount of ink is excessively large locally on the right side of the boundary portion of the line area compared with the example illustrated in FIG. 6A. Therefore, in the example illustrated in FIG. 7A, a large amount of ink bleeding will occur on the right side of the boundary portion of the line area.

FIG. 7B illustrates an example of an image formed based on the image information obtained by correcting the image information on which the example illustrated in FIG. 7A is based. FIG. 7B indicates a state where a deviation has occurred in the registration of the ink in the example illustrated in FIG. 6B. In the example illustrated in FIG. 7B, although the three color inks are superposed locally on the right side of the boundary portion of the line area, in the line area (character area): the density of the third chromatic ink 83 of Yellow color in the inner edge (1 to 2 pixels) of each outline portion of the third chromatic ink 83 is reduced; the density of the second chromatic ink 82 of Magenta color in the inner edge (1 to 2 pixels) of each outline portion of the second chromatic ink 82 is reduced; and the density of the first chromatic ink 81 of Cyan color in the inner edge (1 to 2 pixels) of each outline portion of the first chromatic ink 81 is reduced. As a result, in the example illustrated in FIG. 7B, the total amount of ink is not excessively large locally on the right side of the boundary portion of the line area compared with the example illustrated in FIG. 7A.

As illustrated in each of FIGS. 5B, 6B, and 7B, the image formed based on the corrected image information is reduced in the ink amount in the boundary portion between the background area and the line area. Therefore, the inkjet recording apparatus 100 is capable of lightening the color of the boundary portion between the background area and the line area. Therefore, the inkjet recording apparatus 100 is capable of reducing the amount of ink bleeding occurring in the boundary portions of an image (line and/or character) having a background.

Supplemental Description

Figure 8:
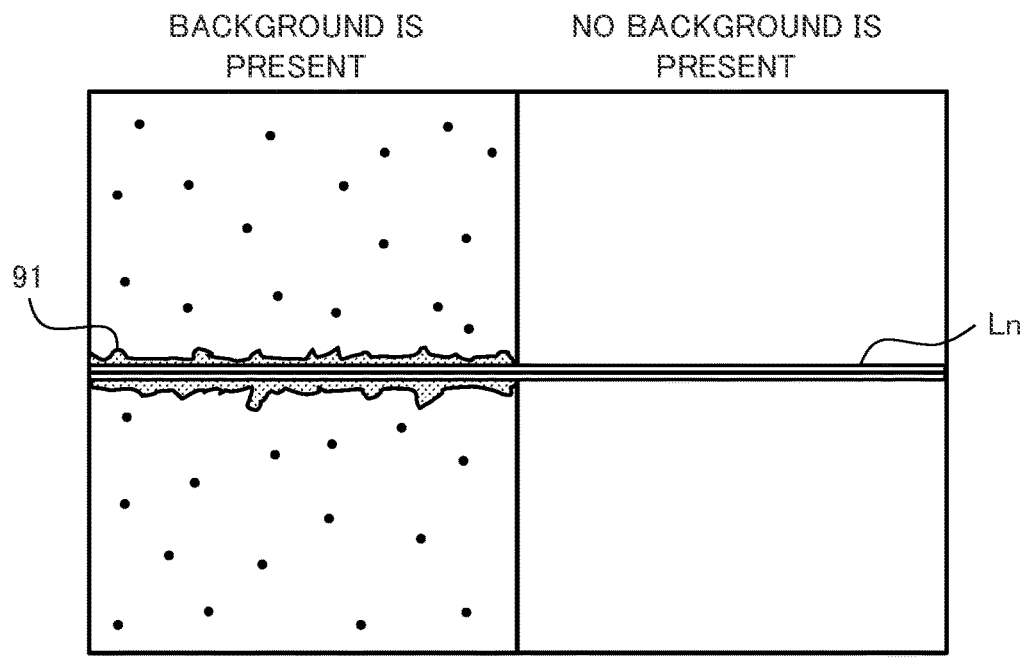
FIG. 8 is an explanatory diagram of ink bleeding.
Figure 9:
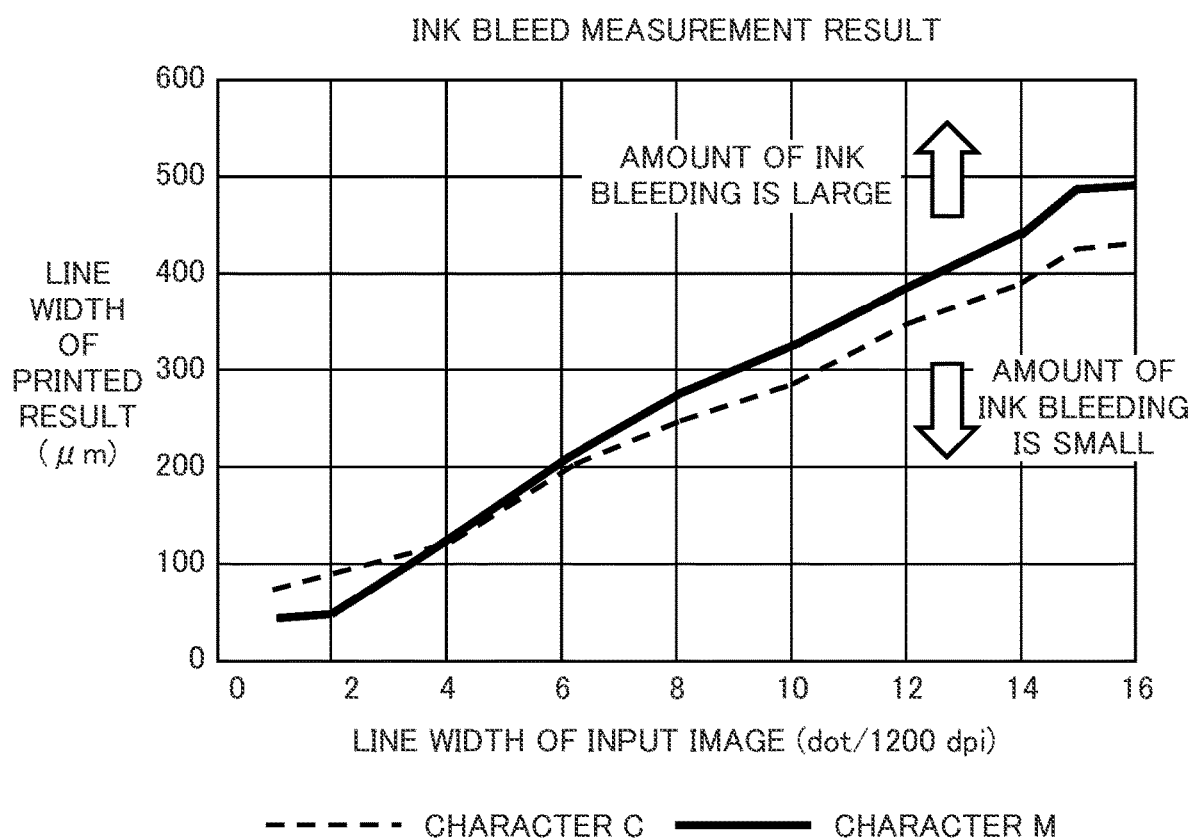
FIG. 9 is a graph showing a result of measuring the amount of ink bleeding.

The embodiment is aimed at providing an inkjet recording apparatus 100 (color image forming apparatus) capable of reducing, for example, the ink bleed 91 shown in FIG. 8. FIG. 8 is a diagram for explaining ink bleeding. FIG. 8 illustrates that a line with a background tends to cause a ink bleed 91 than a line without a background (a line formed on a white base). The ink bleed 91 has a characteristic like as illustrated in FIG. 9. FIG. 9 is a graph showing a result of measuring the amount of ink bleeding. FIG. 9 shows that even a line with a background would produce a different amount of ink bleed 91 in a manner depending on the combination of the colors of the background and the line. In FIG. 9, the dashed line for a character C shows a case of characteristic area Ar2, in which in a state Cyan (C) has landed in advance of Magenta (M), the line (character) is of a mixed color (C+M) of Cyan and Magenta and the background is of Magenta (M) color. In FIG. 9, the solid line for a character M shows a case of characteristic area Ar1, in which in a state Cyan (C) has landed in advance of Magenta (M), the line (character) is of a mixed color (C+M) of Cyan and Magenta and the background is of Cyan (C) color. The inkjet recording apparatus 100 according to the embodiment is capable of reducing such ink bleed 91 by correcting the amount of inks in the boundary portion between a line area and a background area based on the combination pattern of the ink colors of the line area and the background area.

In the case of the above-described Example 1, a characteristic area Ar1 is defined as a combination of the line area and the background area in which the ink(s) to be used in the line area (character area) include a chromatic ink to be printed after the ink(s) to be used in the background area; and a characteristic area Ar2 is defined as a combination of the line area and the background area in which the ink(s) to be used in the line area (character area) include a chromatic ink to be printed in advance of the ink(s) to be used in the background area. In the case of the above-described Example 1, when the corrector 36 corrects the ink amounts, the corrector 36 sets a larger density reduction amount for the characteristic area Ar1 than the characteristic area Ar2.

However, depending on the manner of operation, the definitions of the characteristic areas Ar1 and Ar2 may be altered such that the line area (character area) and the background area are defined in the opposite manner. Specifically, characteristic area Ar1 may be defined as a combination of the line area and the background area in which the ink(s) to be used in the background area include a chromatic ink to be printed after the ink(s) to be used in the line area (character area); and characteristic area Ar2 is defined as a combination of the line area and the background area in which the ink(s) to be used in the background area include a chromatic ink to be printed in advance of the ink(s) to be used in the line area (character area). Characteristic areas Ar1 and Ar2 may be defined in this manner. These definitions can be made in such a manner that in each item of the rows from the second row to the fifth row in FIG. 3, definitions of the background area and the line area (character area) are interchanged. In this case, when the corrector 36 corrects the ink amounts, the corrector 36 sets a larger density reduction amount for the characteristic area Ar2 than the characteristic area Ar1.

In the case of the above-described Example 2, a characteristic area Ar11 is defined as a combination of the line area and the background area in which the ink(s) to be used in the line area (character area) include a chromatic ink to be printed after the ink(s) to be used in the background area and do not include any ink to be used in the background area; a characteristic area Ar12 is defined as a combination of the line area and the background area in which the ink(s) to be used in the line area (character area) include a chromatic ink to be printed after the ink(s) to be used in the background area and include an ink to be used in the background area; a characteristic area Ar21 is defined as a combination of the line area and the background area in which the ink(s) to be used in the line area (character area) include a chromatic ink to be printed in advance of the ink(s) to be used in the background area and do not include any ink to be used in the background area; and a characteristic area Ar22 is defined as a combination of the line area and the background area in which the ink(s) to be used in the line area (character area) include a chromatic ink to be printed in advance of the ink(s)

to be used in the background area and include an ink to be used in the background area. In the case of the above-described Example 2, when the corrector 36 corrects the ink amounts, the corrector 36 sets a larger density reduction amount for characteristic area Ar11 than characteristic area Ar12, sets a larger density reduction amount for characteristic area Ar21 than characteristic area Ar22, and sets a larger density reduction amount for characteristic area Ar12 than characteristic area Ar22.

However, depending on the manner of operation, the definitions of characteristic areas Ar11, Ar12, Ar21, and Ar22 may be altered such that the definitions of the line area (character area) and the background area are defined in the opposite manner. Specifically, a characteristic area Ar11 is defined as a combination of the line area and the background area in which the ink(s) to be used in the background area include a chromatic ink to be printed after the ink(s) to be used in the line area (character area) and do not include any ink to be used in the line area (character area); a characteristic area Ar12 is defined as a combination of the line area and the background area in which the ink(s) to be used in the background area include a chromatic ink to be printed after the ink(s) to be used in the line area (character area) and include an ink to be used in the line area (character area); a characteristic area Ar21 is defined as a combination of the line area and the background area in which the ink(s) to be used in the background area include a chromatic ink to be printed in advance of the ink(s) to be used in the line area (character area) and do not include any ink to be used in the line area (character area); and a characteristic area Ar22 is defined as a combination of the line area and the background area in which the ink(s) to be used in the background area include a chromatic ink to be printed in advance of the ink(s) to be used in the line area (character area) and include an ink to be used in the line area (character area). Characteristic areas Ar11, Ar12, Ar21, and Ar22 may be defined in this manner. These can be made in such a manner that in each item of the rows from the second row to the fifth row in FIG. 3, definitions of the background area and the line area (character area) are interchanged. In this case, when the corrector 36 corrects the ink amounts, the corrector 36 sets a larger density reduction amount for characteristic area Ar12 than characteristic area Ar11, sets a larger density reduction amount for characteristic area Ar22 than characteristic area Ar21, and sets a larger density reduction amount for characteristic area Ar21 than characteristic area Ar11.

In addition, in above-described Examples 1 and 2, the conditions for detecting each characteristic area may be added with a condition such that a line area (character area) be constituted of inks of multiple colors and a background area be constituted of inks of one or more colors. With this configuration, even when three or more color inks are used in a line area (character area) and the amount of each ink is not so large, an area that produces a large amount of ink bleeding may be efficiently detected.

In addition, in the above-described Examples 1 and 2, when the definitions of a line area (character area) and a background area of each characteristic area are defined in the opposite manner, the conditions for detecting each characteristic area may be added with a condition such that a background area be constituted of inks of multiple colors and a line area (character area) be constituted of an ink of one color or be constituted of inks of one or more colors. With this configuration, even when three or more color inks are used in a background area and the amount of each ink is not so large, an area that produces a large amount of ink bleeding may be efficiently detected.

Note that the formulas to be used in these cases may be as follows:

$$\mathrm{LINE\_}C = (C\mathrm{in} > \mathrm{LINE}th)?1:0 \qquad (1)$$

$$\mathrm{LINE\_}M = (M\mathrm{in} > \mathrm{LINE}th)?1:0 \qquad (2)$$

$$\mathrm{LINE\_}Y = (Y\mathrm{in} > \mathrm{LINE}th)?1:0 \qquad (3)$$

$$\mathrm{LINE\_}K = (K\mathrm{in} > \mathrm{LINE}th)?1:0 \qquad (4)$$

$$\mathrm{LINE\_}CMYK = (C\mathrm{in} + M\mathrm{in} + Y\mathrm{in} + K\mathrm{in} > \mathrm{LINE\_}CMYKth)?1:0 \qquad (5)$$

Formulas (1) to (4) are the same as above described. The formulas to be used in these case are added with formula (5) to the formulas (1) to (4).

Here, the portion "LINE_CMYK=($C$in+$M$in+$Y$in+$K$in>LINE_CMYKth)?" of formula (5) represents a condition for determining whether the total of the CMYK data exceeds a threshold value (LINE_CMYKth) of ink colors used in a line area.

The right portion "1:0" of formula (5) represents that a value of 1 is outputted when the condition is satisfied (i.e., when the total of the CMYK data exceeds the threshold value LINE_CMYKth of ink colors used in a line area) and that a value of 0 is outputted when the condition is not satisfied (i.e., when the total of the CMYK data is less than or equal to the threshold value LINE_CMYKth of ink colors used in a line area).

Various recording mediums (paper) with various characteristics are present. A recording medium (paper) may or may not allow inks to permeate quickly. In view of this, it is conceivable to configure the inkjet recording apparatus 100 to allow a user to change (set) a correction coefficient based on the type of the recording medium (paper). In this case, the inkjet recording apparatus 100 may be configured to change (set) a correction coefficient by the corrector 36 (see FIG. 2), based on the type of the paper set by the user using the operation panel 11 (see FIG. 1). Hereinafter, the correction coefficient set based on the type of the paper is referred to as "a paper-dependent correction coefficient". The paper-dependent correction coefficient may be set such that, for example, the paper-dependent correction coefficient for a recording medium (paper) having a characteristic that makes it difficult for inks to permeate (paper having low permeability and thus making it easy for inks to bleed) may be given a smaller value than the value for a recording medium (paper) having a characteristic that makes it easy for inks to permeate quickly (paper having high permeability and thus making it difficult for inks to bleed). Specifically, the paper-dependent correction coefficient may be given a value of 1.0 for the case of a recording medium (paper) having a characteristic that makes it easy for inks to permeate quickly (paper having high permeability and thus making it difficult for inks to bleed), and the paper-dependent correction coefficient may be given a value of 0.9 for the case of a recording medium (paper) having a characteristic that makes it difficult for inks to permeate (paper having low permeability and thus making it easy for inks to bleed). The corrector 36 (see FIG. 2) of the inkjet recording apparatus 100 multiplies the correction coefficients based on the respective characteristic areas to the color image information (CMYK data) included in the print instruction 61 (see FIG. 2) and then further multiplies this paper-dependent correction coefficient to the multiplication result.

Major Features of Inkjet Recording Apparatus (1) As illustrated in FIGS. 1 and 2, an inkjet recording apparatus 100 (color image forming apparatus) according to the embodiment includes a controller 21 implemented using one or more hardware processors, wherein the controller 21 includes a line area detector 31, a background area detector 32, a line area color detector 33, a background area color detector 34, a color comparator 35, a corrector 36, each implemented using one or more of the one or more hardware processors. The line area detector 31 detects a line area. The background area detector 32 detects a background area adjacent to the line area. The line area color detector 33 detects first one or more ink colors of first one or more inks to be used in the line area. The background area color detector 34 detects second one or more ink colors of second one or more inks to be used in the background area. The color comparator 35 compares the first one or more ink colors and the second one or more ink colors to identify a combination pattern of the first one or more ink colors and the second one or more ink colors. The corrector 36 determines whether to correct amounts of the first one or more inks of a boundary portion between the line area and the background area and amounts of the second one or more inks of the boundary portion, based on the identified combination pattern.

The inkjet recording apparatus 100 according to the embodiment as described above is capable of correcting the amounts of the inks of the boundary portion between the line area and the background area based on the amount of ink bleeding depending on the combination pattern of the ink colors of the line area and the background area. Here, the combination pattern includes information on the number of the ink colors and the landing order and the like of the inks to be used in the line area (character area) and the background area. This makes it possible to make insufficient correction and excessive correction less likely to occur, and thus makes it possible to perform appropriate correction. As a result, it is possible to reduce the ink bleeding occurring in boundary portions of an image (lines and/or characters) having a background.

(2) The inkjet recording apparatus 100 according to the embodiment may be configured such that: a characteristic area Ar1 is defined as a combination of the line area and the background area in which the first one or more inks to be used in the line area include a chromatic ink to be printed after the second one or more inks to be used in the background area; a characteristic area Ar2 is defined as a combination of the line area and the background area in which the first one or more inks to be used in the line area include a chromatic ink to be printed in advance of the second one or more inks to be used in the background area; and when the color comparator 35 detects at least either the characteristic area Ar1 or the characteristic area Ar2 as a characteristic area based on a result of comparing the first one or more ink colors and the second one or more ink colors, the corrector 36 corrects the amounts of inks to be used in the characteristic area.

The inkjet recording apparatus 100 according to the embodiment as described above is capable of, by detecting the characteristic areas Ar1 and Ar2, correcting the amounts of the inks based on the amount of ink bleeding depending on the number of colors and the landing order and the like of the inks of the characteristic areas Ar1 and Ar2. This makes it possible to make insufficient correction and excessive correction less likely to occur, and thus makes it possible to perform appropriate correction. As a result, it is possible to reduce the ink bleeding occurring in boundary portions of an image (lines and/or characters) having a background.

(3) The inkjet recording apparatus 100 according to the embodiment may be configured such that when the corrector 36 corrects the amounts of the inks to be used in the characteristic area, the corrector 36 reduces densities of the inks to be used in the characteristic area with a density reduction amount, and the corrector 36 uses a larger value for the density reduction amount when correcting amounts of inks to be used in the characteristic area Ar1 than when correcting amounts of inks to be used in the characteristic area Ar2.

The inkjet recording apparatus 100 according to the embodiment as described above is capable of efficiently reducing the ink bleeding occurring in boundary portions of an image (lines and/or characters) having a background.

(4) As described in Supplemental Description section given above, when the line area (character area) and the background area of a characteristic area are defined in the opposite manner, the inkjet recording apparatus 100 according to the embodiment may be configured such that: a characteristic area Ar1 is defined as a combination of the line area and the background area in which the second one or more inks to be used in the background area include a chromatic ink to be printed after the first one or more inks to be used in the line area; a characteristic area Ar2 is defined as a combination of the line area and the background area in which the second one or more inks to be used in the background area include a chromatic ink to be printed in advance of the first one or more inks to be used in the line area; and when the color comparator 35 detects at least either the characteristic area Ar1 or the characteristic area Ar2 as a characteristic area based on a result of comparing the first one or more ink colors and the second one or more ink colors, the corrector 36 corrects amounts of inks to be used in the characteristic area.

The inkjet recording apparatus 100 according to the embodiment as described above is capable of efficiently reducing the ink bleeding occurring in boundary portions of an image (lines and/or characters) having a background.

(5) As described in Supplemental Description section given above, when the line area (character area) and the background area of a characteristic area are defined in the opposite manner, the inkjet recording apparatus 100 according to the embodiment may be configured such that when the corrector 36 corrects the amounts of the inks to be used in the characteristic area, the corrector 36 reduces densities of the inks to be used in the characteristic area with a density reduction amount, and the corrector 36 uses a larger value for the density reduction amount when correcting amounts of inks to be used in the characteristic area Ar2 than when correcting amounts of inks to be used in the characteristic area Ar1.

The inkjet recording apparatus 100 according to the embodiment as described above is capable of efficiently reducing the ink bleeding occurring in boundary portions of an image (lines and/or characters) having a background.

(6) The inkjet recording apparatus 100 according to the embodiment may be configured such that: a characteristic area Ar11 is defined as a combination of the line area and the background area in which the first one or more inks to be used in the line area include a chromatic ink to be printed after the second one or more inks to be used in the background area and include none of the second one or more inks to be used in the background area; a characteristic area Ar12 is defined as a combination of the line area and the background area in which the first one or more inks to be used in the line area include a chromatic ink to be printed after the second one or more inks to be used in the background area and include one or more of the second one or more inks to be used in the background area; a characteristic area Ar21 is defined as a combination of the line area and the background area in which the first one or more inks to be used in the line area include a chromatic ink to be printed in advance of the second one or more inks to be used in the background area and include none of the second one or more inks to be used in the background area; a characteristic area Ar22 is defined as a combination of the line area and the background area in which the first one or more inks to be used in the line area include a chromatic ink to be printed in advance of the second one or more inks to be used in the background area and include one or more of the second one or more inks to be used in the background area; and when the color comparator 35 detects at least either the characteristic area Ar11, Ar12, Ar21, or Ar22 as a characteristic area based on a result of comparing the first one or more ink colors and the second one or more ink colors, the corrector 36 corrects amounts of inks to be used in the characteristic area.

The inkjet recording apparatus 100 according to the embodiment as described above is capable of, by detecting the characteristic areas Ar11, Ar12, Ar21, and Ar22, correcting the amounts of the inks based on the amount of ink bleeding depending on the number of colors and the landing order and the like of the inks of the characteristic areas Ar11, Ar12, Ar21, and Ar22. This makes it possible to make insufficient correction and excessive correction less likely to occur, and thus makes it possible to perform appropriate correction. As a result, it is possible to reduce the ink bleeding occurring in boundary portions of an image (lines and/or characters) having a background.

(7) The inkjet recording apparatus 100 according to the embodiment may be configured such that when the corrector 36 corrects the amounts of the inks to be used in the characteristic area, the corrector 36 reduces densities of the inks to be used in the characteristic area with a density reduction amount, the corrector 36 uses a larger value for the density reduction amount when correcting amounts of inks to be used in the characteristic area Ar11 than when correcting amounts of inks to be used in the characteristic area Ar12, the corrector 36 uses a larger value for the density reduction amount when correcting amounts of inks to be used in the characteristic area Ar21 than when correcting amounts of inks to be used in the characteristic area Ar22, and the corrector 36 uses a larger value for the density reduction amount when correcting the amounts of the inks to be used in the characteristic area Ar12 than when correcting the amounts of the inks to be used in the characteristic area Ar22.

The inkjet recording apparatus 100 according to the embodiment as described above is capable of efficiently reducing the ink bleeding occurring in boundary portions of an image (lines and/or characters) having a background.

(8) As described in Supplemental Description section given above, when the line area (character area) and the background area of a characteristic area are defined in the opposite manner, the inkjet recording apparatus 100 according to the embodiment may be configured such that: a characteristic area Ar11 is defined as a combination of the line area and the background area in which the second one or more inks to be used in the background area include a chromatic ink to be printed after the first one or more inks to be used in the line area and include none of the first one or more inks to be used in the line area; a characteristic area Ar12 is defined as a combination of the line area and the background area in which the second one or more inks to be used in the background area include a chromatic ink to be printed after the first one or more inks to be used in the line area and include one or more of the first one or more inks to be used in the line area; a characteristic area Ar21 is defined as a combination of the line area and the background area in which the second one or more inks to be used in the background area include a chromatic ink to be printed in advance of the first one or more inks to be used in the line area and include none of the first one or more inks to be used in the line area; a characteristic area Ar22 is defined as a combination of the line area and the background area in which the second one or more inks to be used in the background area include a chromatic ink to be printed in advance of the first one or more inks to be used in the line area and include one or more of the first one or more inks to be used in the line area; and when the color comparator 35 detects at least either the characteristic area Ar11, Ar12, Ar21, or Ar22 as a characteristic area based on a result of comparing the first one or more ink colors and the second one or more ink colors, the corrector 36 corrects amounts of inks to be used in the characteristic area.

The inkjet recording apparatus 100 according to the embodiment as described above is capable of, by detecting the characteristic areas Ar11, Ar12, Ar21, and Ar22, correcting the amounts of the inks based on the amount of ink bleeding depending on the number of colors and the landing order and the like of the inks of the characteristic areas Ar11, Ar12, Ar21, and Ar22. This makes it possible to make insufficient correction and excessive correction less likely to occur, and thus makes it possible to perform appropriate correction. As a result, it is possible to reduce the ink bleeding occurring in boundary portions of an image (lines and/or characters) having a background.

(9) As described in Supplemental Description section given above, when the line area (character area) and the background area of a characteristic area are defined in the opposite manner, the inkjet recording apparatus 100 according to the embodiment may be configured such that when the corrector 36 corrects the amounts of the inks to be used in the characteristic area, the corrector 36 reduces densities of the inks to be used in the characteristic area with a density reduction amount, the corrector 36 uses a larger value for the density reduction amount when correcting amounts of inks to be used in the characteristic area Ar12 than when correcting amounts of inks to be used in the characteristic area Ar11, the corrector 36 uses a larger value for the density reduction amount when correcting amounts of inks to be used in the characteristic area Ar22 than when correcting amounts of inks to be used in the characteristic area Ar21, and the corrector 36 uses a larger value for the density reduction amount when correcting the amounts of the inks to be used in the characteristic area Ar21 than when correcting the amounts of the inks to be used in the characteristic area Ar11.

The inkjet recording apparatus 100 according to the embodiment as described above is capable of efficiently reducing the ink bleeding occurring in boundary portions of an image (lines and/or characters) having a background.

(10) The inkjet recording apparatus 100 according to the embodiment may be configured such that: the line area detector 31 detects the line area under a condition that the first one or more inks to be used in the line area be constituted of inks of multiple colors; and the background area detector 32 detects the background area under a condition that the second one or more inks to be used in the background area be constituted of inks of one or more colors.

The inkjet recording apparatus 100 according to the embodiment as described above is capable of efficiently detecting characteristic areas. As a result, it is possible to efficiently reduce the ink bleeding occurring in boundary portions of an image (lines and/or characters) having a background.

(11) As described in Supplemental Description section given above, when the line area (character area) and the background area of a characteristic area are defined in the opposite manner, the inkjet recording apparatus 100 according to the embodiment may be configured such that: the line area detector 31 detects the line area under a condition that the first one or more inks to be used in the line area be constituted of an ink of one color; and the background area detector 32 detects the background area under a condition that the second one or more inks to be used in the background area be constituted of inks of multiple colors.

The inkjet recording apparatus 100 according to the embodiment as described above is capable of efficiently detecting characteristic areas. As a result, it is possible to efficiently reduce the ink bleeding occurring in boundary portions of an image (lines and/or characters) having a background.

(12) The inkjet recording apparatus 100 according to the embodiment may be configured such that: the line area detector 31 detects the line area under a condition that a total amount of the first one or more inks to be used in the line area be greater than or equal to a predetermined value; and the background area detector 32 detects the background area under a condition that the second one or more inks to be used in the background area be constituted of inks of one or more colors.

The inkjet recording apparatus 100 according to the embodiment as described above is capable of efficiently detecting characteristic areas. As a result, it is possible to efficiently reduce the ink bleeding occurring in boundary portions of an image (lines and/or characters) having a background.

(13) As described in Supplemental Description section given above, when the line area (character area) and the background area of a characteristic area are defined in the opposite manner, the inkjet recording apparatus 100 according to the embodiment may be configured such that: the line area detector 31 detects the line area under a condition that the first one or more inks to be used in the line area be constituted of inks of one or more colors; and the background area detector 32 detects the background area under a condition that a total amount of the second one or more inks to be used in the background area be greater than or equal to a predetermined value.

The inkjet recording apparatus 100 according to the embodiment as described above is capable of efficiently detecting characteristic areas. As a result, it is possible to efficiently reduce the ink bleeding occurring in boundary portions of an image (lines and/or characters) having a background.

(14) As described in Supplemental Description section given above, the inkjet recording apparatus 100 according to the embodiment may be configured such that when the corrector 36 determines to correct the amounts of the first one or more inks and the amounts of the second one or more inks, the corrector 36 corrects the amounts of the first one or more inks and the amounts of the second one or more inks in a manner depending on a type of a recording medium.

The corrector 36 of the inkjet recording apparatus 100 according to the embodiment as described above multiplies the correction coefficients based on the respective characteristic areas to the color image information (CMYK data) included in the print instruction 61 (see FIG. 2) and then further multiplies the paper-dependent correction coefficient to the multiplication result. This makes it possible to suitably correct the amounts of the inks of the boundary portion between the line area and the background area. As a result, it is possible to efficiently reduce the ink bleeding occurring in boundary portions of an image (lines and/or characters) having a background.

(15) The inkjet recording apparatus 100 according to the embodiment may be configured such that the amounts of the first one or more inks to be used in the line area and the amounts of the second one or more inks to be used in the background area are included in a print instruction, and wherein, when correcting the amounts of the first one or more inks and the amounts of the second one or more inks, the corrector 36 corrects the amounts of the first one or more inks and the amounts of the second one or more inks by multiplying a correction coefficient taking a value smaller than 1.0.

The inkjet recording apparatus 100 according to the embodiment as described above is capable of reducing the amounts of the inks of the boundary portion between the line area and the background area. As a result, it is possible to efficiently reduce the ink bleeding occurring in boundary portions of an image (lines and/or characters) having a background.

(16) The inkjet recording apparatus 100 according to the embodiment is capable of performing an inkjet recording method (color image forming method) including steps of: detecting, by the line area detector 31, a line area; detecting, by the background area detector 32, a background area adjacent to the line area; detecting, by the line area color detector 33, first one or more ink colors of first one or more inks to be used in the line area; detecting, by the background area color detector 34, second one or more ink colors of second one or more inks to be used in the background area; comparing, by the color comparator 35, the first one or more ink colors and the second one or more ink colors to identify a combination pattern of the first one or more ink colors and the second one or more ink colors; and determining, by the corrector 36, whether to correct amounts of the first one or more inks and amounts of the second one or more inks, based on the identified combination pattern.

The inkjet recording method according to the embodiment as described above is capable of correcting the amounts of the inks of the boundary portion between the line area and the background area based on the amount of ink bleeding depending on the combination pattern of the ink colors of the line area and the background area. Here, the combination pattern includes information on the number of colors and the landing order and the like of the inks to be used in the line area (character area) and the background area. This makes it possible to make insufficient correction and excessive correction less likely to occur, and thus makes it possible to perform appropriate correction. As a result, it is possible to reduce the ink bleeding occurring in boundary portions of an image (lines and/or characters) having a background.

As described above, according to the inkjet recording apparatus 100 (color image forming apparatus) according to the embodiment, it is possible to reduce the ink bleeding occurring in boundary portions of an image (lines and/or characters) having a background.

Although embodiments of the present invention have been described and illustrated in detail, the disclosed embodiments are made for purposes of illustration and example only and not limitation. The scope of the present invention should be interpreted by terms of the appended claims. It should be noted that the scope of the present invention is not limited to the embodiments described above and that the present invention can be practiced with various modifications within the scope of the present invention.

For example, the above-described embodiments have been described in detail for the sake of clear description of the gist of the present invention. Thus, the present invention is not limited to those including all the constituent elements described above. Moreover, in the present invention, other constituent elements may be added to a certain constituent element, and some constituent elements may be changed to other constituent elements. Further, in the present invention, some constituent elements may be omitted.

What is claimed is:

1. A color image forming apparatus comprising:
   a controller implemented using one or more hardware processors,
   wherein the controller:
      receives print instruction data;
      detects, based on the received print instruction data, a line area and a background area adjacent to the line area;
      detects, based on the received print instruction data, (i) first one or more ink colors of first one or more inks to be used in the line area during printing, and (ii) second one or more ink colors of second one or more inks to be used in the background area during printing;
      compares the first one or more ink colors and the second one or more ink colors to identify a combination pattern of the first one or more ink colors and the second one or more ink colors, from among a plurality of predetermined stored combination patterns; and
      determines whether to correct amounts of the first one or more inks and amounts of the second one or more inks to be used during printing, based on the identified combination pattern,
   wherein each of the predetermined stored combination patterns indicates a different relationship between the first one or more ink colors and the second one or more ink colors.

2. The color image forming apparatus according to claim 1,
   wherein a first characteristic area is defined as a combination of the line area and the background area in which the first one or more inks to be used in the line area include a chromatic ink to be printed after the second one or more inks to be used in the background area,
   wherein a second characteristic area is defined as a combination of the line area and the background area in which the first one or more inks to be used in the line area include a chromatic ink to be printed in advance of the second one or more inks to be used in the background area, and
   wherein when the controller detects at least one of the first characteristic area and the second characteristic area as a characteristic area based on a result of comparing the first one or more ink colors and the second one or more ink colors, the controller corrects amounts of inks to be used in the characteristic area.

3. The color image forming apparatus according to claim 2,
   wherein when the controller corrects the amounts of the inks to be used in the characteristic area, the controller reduces densities of the inks to be used in the characteristic area by a density reduction amount, and
   wherein the controller uses a larger value for the density reduction amount when correcting amounts of inks to be used in the first characteristic area than when correcting amounts of inks to be used in the second characteristic area.

4. The color image forming apparatus according to claim 1,
   wherein a first characteristic area is defined as a combination of the line area and the background area in which the second one or more inks to be used in the background area include a chromatic ink to be printed after the first one or more inks to be used in the line area,
   wherein a second characteristic area is defined as a combination of the line area and the background area in which the second one or more inks to be used in the background area include a chromatic ink to be printed in advance of the first one or more inks to be used in the line area, and
   wherein when the controller detects at least one of the first characteristic area and the second characteristic area as a characteristic area based on a result of comparing the first one or more ink colors and the second one or more ink colors, the controller corrects amounts of inks to be used in the characteristic area.

5. The color image forming apparatus according to claim 4,
   wherein when the controller corrects the amounts of the inks to be used in the characteristic area, the controller reduces densities of the inks to be used in the characteristic area by a density reduction amount, and
   wherein the controller uses a larger value for the density reduction amount when correcting amounts of inks to be used in the second characteristic area than when correcting amounts of inks to be used in the first characteristic area.

6. The color image forming apparatus according to claim 1,
   wherein a first characteristic area is defined as a combination of the line area and the background area in which the first one or more inks to be used in the line area include a chromatic ink to be printed after the second one or more inks to be used in the background area and include none of the second one or more inks to be used in the background area,
   wherein a second characteristic area is defined as a combination of the line area and the background area in which the first one or more inks to be used in the line area include a chromatic ink to be printed after the second one or more inks to be used in the background area and include one or more of the second one or more inks to be used in the background area,
   wherein a third characteristic area is defined as a combination of the line area and the background area in which the first one or more inks to be used in the line area include a chromatic ink to be printed in advance of the second one or more inks to be used in the background area and include none of the second one or more inks to be used in the background area,
   wherein a fourth characteristic area is defined as a combination of the line area and the background area in which the first one or more inks to be used in the line area include a chromatic ink to be printed in advance of the second one or more inks to be used in the background area and include one or more of the second one or more inks to be used in the background area, and wherein when the controller detects at least one of the first characteristic area, the second characteristic area, the third characteristic area, and the fourth characteristic area as a characteristic area based on a result of comparing the first one or more ink colors and the second one or more ink colors, the controller corrects amounts of inks to be used in the characteristic area.

7. The color image forming apparatus according to claim 6,
wherein when the controller corrects the amounts of the inks to be used in the characteristic area, the controller reduces densities of the inks to be used in the characteristic area by a density reduction amount,
wherein the controller uses a larger value for the density reduction amount when correcting amounts of inks to be used in the first characteristic area than when correcting amounts of inks to be used in the second characteristic area,
wherein the controller uses a larger value for the density reduction amount when correcting amounts of inks to be used in the third characteristic area than when correcting amounts of inks to be used in the fourth characteristic area, and
wherein the controller uses a larger value for the density reduction amount when correcting the amounts of the inks to be used in the second characteristic area than when correcting the amounts of the inks to be used in the fourth characteristic area.

8. The color image forming apparatus according to claim 1,
wherein a first characteristic area is defined as a combination of the line area and the background area in which the second one or more inks to be used in the background area include a chromatic ink to be printed after the first one or more inks to be used in the line area and include none of the first one or more inks to be used in the line area,
wherein a second characteristic area is defined as a combination of the line area and the background area in which the second one or more inks to be used in the background area include a chromatic ink to be printed after the first one or more inks to be used in the line area and include one or more of the first one or more inks to be used in the line area,
wherein a third characteristic area is defined as a combination of the line area and the background area in which the second one or more inks to be used in the background area include a chromatic ink to be printed in advance of the first one or more inks to be used in the line area and include none of the first one or more inks to be used in the line area,
wherein a fourth characteristic area is defined as a combination of the line area and the background area in which the second one or more inks to be used in the background area include a chromatic ink to be printed in advance of the first one or more inks to be used in the line area and include one or more of the first one or more inks to be used in the line area, and
wherein when the controller detects at least one of the first characteristic area, the second characteristic area, the third characteristic area, and the fourth characteristic area as a characteristic area based on a result of comparing the first one or more ink colors and the second one or more ink colors, the controller corrects amounts of inks to be used in the characteristic area.

9. The color image forming apparatus according to claim 8,
wherein when the controller corrects the amounts of the inks to be used in the characteristic area, the controller reduces densities of the inks to be used in the characteristic area by a density reduction amount,
wherein the controller uses a larger value for the density reduction amount when correcting amounts of inks to be used in the second characteristic area than when correcting amounts of inks to be used in the first characteristic area,
wherein the controller uses a larger value for the density reduction amount when correcting amounts of inks to be used in the fourth characteristic area than when correcting amounts of inks to be used in the third characteristic area, and
wherein the controller uses a larger value for the density reduction amount when correcting the amounts of the inks to be used in the third characteristic area than when correcting the amounts of the inks to be used in the first characteristic area.

10. The color image forming apparatus according to claim 1,
wherein the line area is an area in which the first one or more inks to be used in the line area during printing are constituted of inks of multiple colors, and
wherein the background area is an area in which the second one or more inks to be used in the background area during printing are constituted of inks of one or more colors.

11. The color image forming apparatus according to claim 1,
wherein the line area is an area in which the first one or more inks to be used in the line area during printing are constituted of an ink of one color, and
wherein the background area is an area in which the second one or more inks to be used in the background area during printing are constituted of inks of multiple colors.

12. The color image forming apparatus according to claim 1,
wherein the line area is an area in which a total amount of the first one or more inks to be used in the line area during printing is greater than or equal to a predetermined value, and
wherein the background area is an area in which the second one or more inks to be used in the background area during printing are constituted of inks of one or more colors.

13. The color image forming apparatus according to claim 1,
wherein the line area is an area in which the first one or more inks to be used in the line area during printing are constituted of inks of one or more colors, and
wherein the background area is an area in which a total amount of the second one or more inks to be used in the background area during printing is greater than or equal to a predetermined value.

14. The color image forming apparatus according to claim 1,
wherein when the controller determines to correct the amounts of the first one or more inks and the amounts of the second one or more inks to be used during printing, the controller corrects the amounts of the first one or more inks and the amounts of the second one or more inks in a manner depending on a type of a recording medium.

15. The color image forming apparatus according to claim 1,
wherein the amounts of the first one or more inks to be used in the line area during printing and the amounts of the second one or more inks to be used in the background area during printing are included in the print instruction data, and
wherein, when correcting the amounts of the first one or more inks and the amounts of the second one or more inks, the controller corrects the amounts of the first one or more inks and the amounts of the second one or more inks by multiplying a correction coefficient taking a value smaller than 1.0.

16. A method for a color image forming apparatus to form a color image, the color image forming apparatus comprising a controller implemented using one or more hardware processors, and the method comprising:
receiving, by the controller, print instruction data;
detecting, by the controller based on the received print instruction data, a line area and a background area adjacent to the line area;
detecting, by the controller based on the received print instruction data, (i) first one or more ink colors of first one or more inks to be used in the line area during printing, and (ii) second one or more ink colors of second one or more inks to be used in the background area during printing;
comparing, by the controller, the first one or more ink colors and the second one or more ink colors to identify a combination pattern of the first one or more ink colors and the second one or more ink colors, from among a plurality of predetermined stored combination patterns; and
determining, by the controller, whether to correct amounts of the first one or more inks and amounts of the second one or more inks to be used during printing, based on the identified combination pattern,
wherein each of the predetermined stored combination patterns indicates a different relationship between the first one or more ink colors and the second one or more ink colors.

* * * * *